(12) United States Patent
Dasher et al.

(10) Patent No.: US 12,444,397 B2
(45) Date of Patent: Oct. 14, 2025

(54) SYSTEMS AND METHODS FOR PRE-GENERATED INVERSE AUDIO CANCELING

(71) Applicant: Adeia Guides Inc., San Jose, CA (US)

(72) Inventors: Charles Dasher, Lawrenceville, GA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 305 days.

(21) Appl. No.: 18/128,542

(22) Filed: Mar. 30, 2023

(65) Prior Publication Data

US 2024/0331678 A1 Oct. 3, 2024

(51) Int. Cl.
*G10K 11/178* (2006.01)
*G06F 3/16* (2006.01)

(52) U.S. Cl.
CPC ........ *G10K 11/17823* (2018.01); *G06F 3/165* (2013.01); *G10K 11/17873* (2018.01); *G10K 2210/3027* (2013.01); *G10K 2210/3044* (2013.01); *G10K 2210/3056* (2013.01)

(58) Field of Classification Search
CPC ....... G10K 11/17823; G10K 11/17873; G10K 11/17885; G10K 11/17827; G10K 2210/1081; G10K 2210/3027; G10K 2210/3044; G10K 2210/3056; G06F 3/165
USPC ....................................................... 381/71.8
See application file for complete search history.

(56) References Cited

U.S. PATENT DOCUMENTS

2024/0233702 A9 * 7/2024 Armstrong .......... G10L 21/0208

* cited by examiner

*Primary Examiner* — Paul Kim
(74) *Attorney, Agent, or Firm* — HALEY GUILIANO LLP

(57) ABSTRACT

System and method are provided for pre-generated inverse audio canceling. A system may identify source audio content that a first device is playing via a first speaker, retrieve pre-generated inverse audio content associated with the identified audio content, modify at least a portion of the retrieved inverse audio content, and cause the modified inverse audio content to be played in synchronization with the identified source audio content to attenuate at least a portion of the source audio content that is playing via the first speaker.

20 Claims, 21 Drawing Sheets

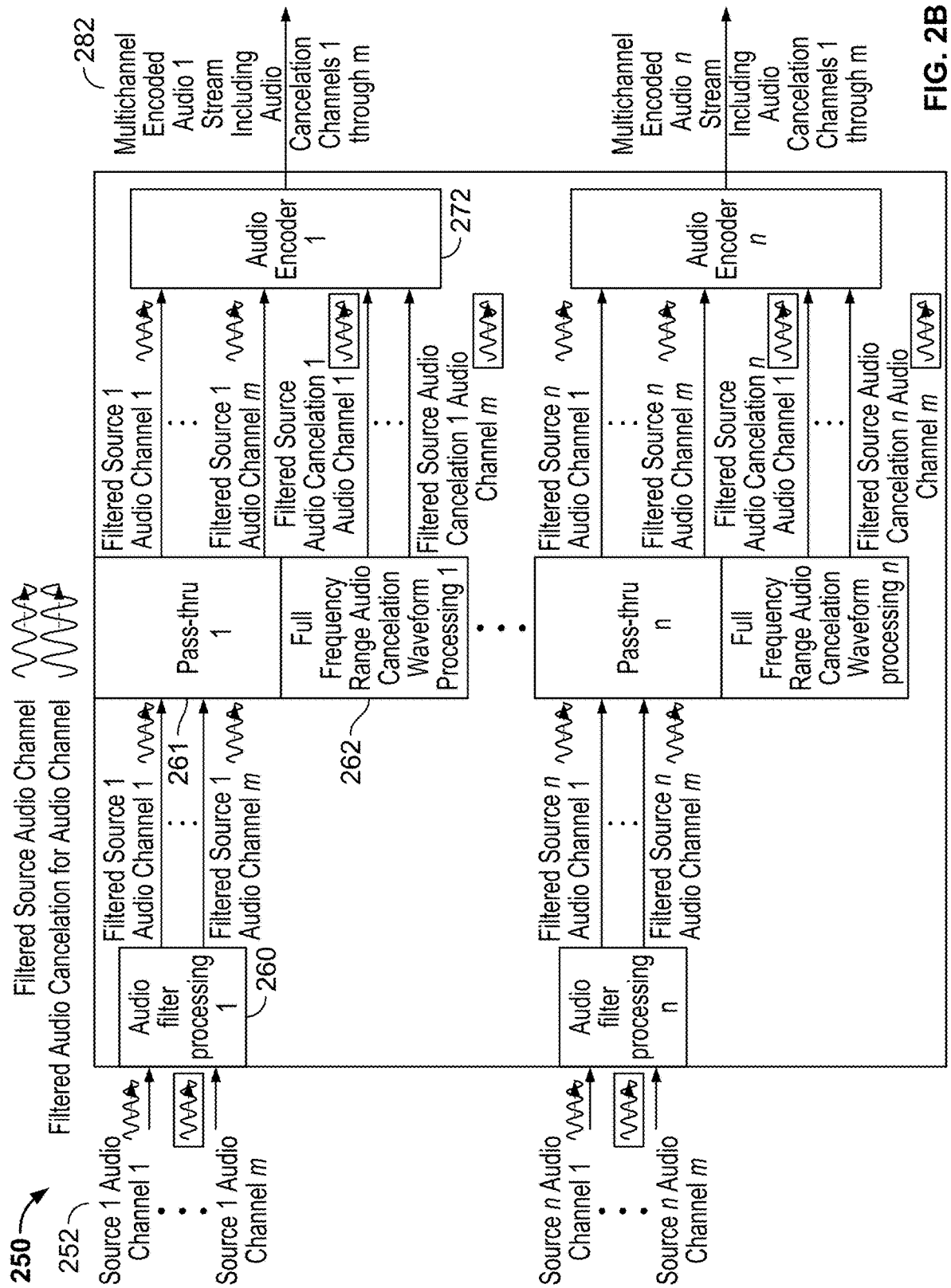

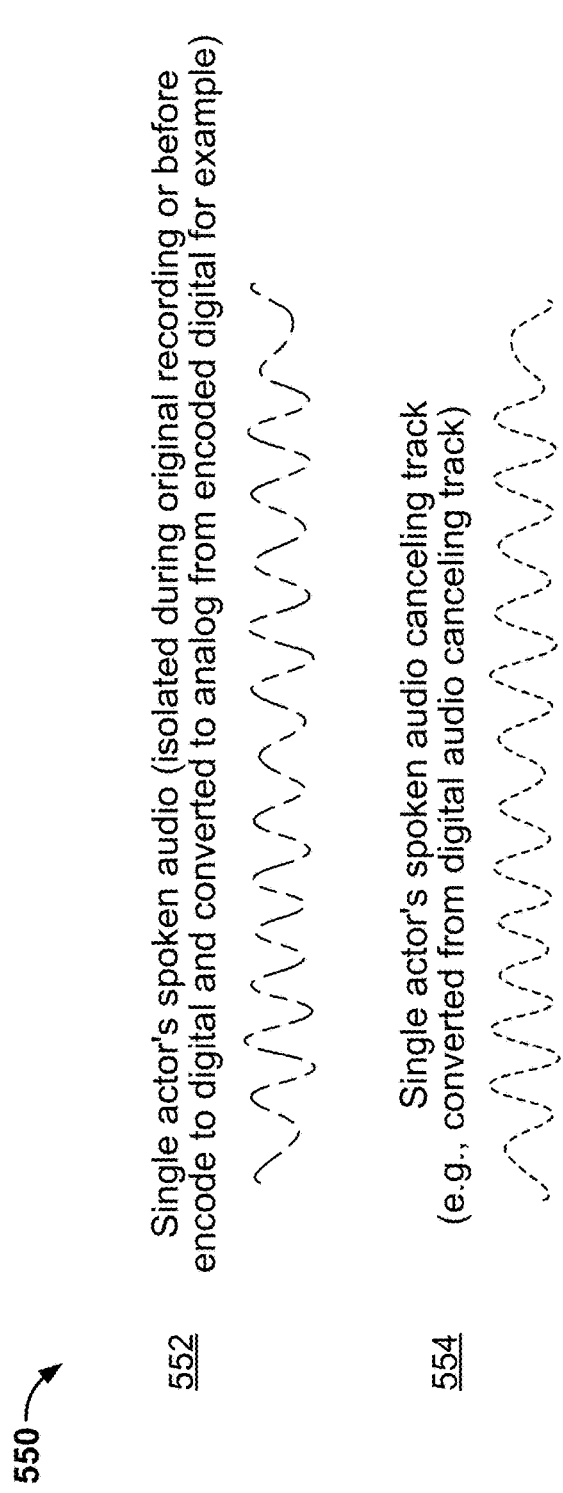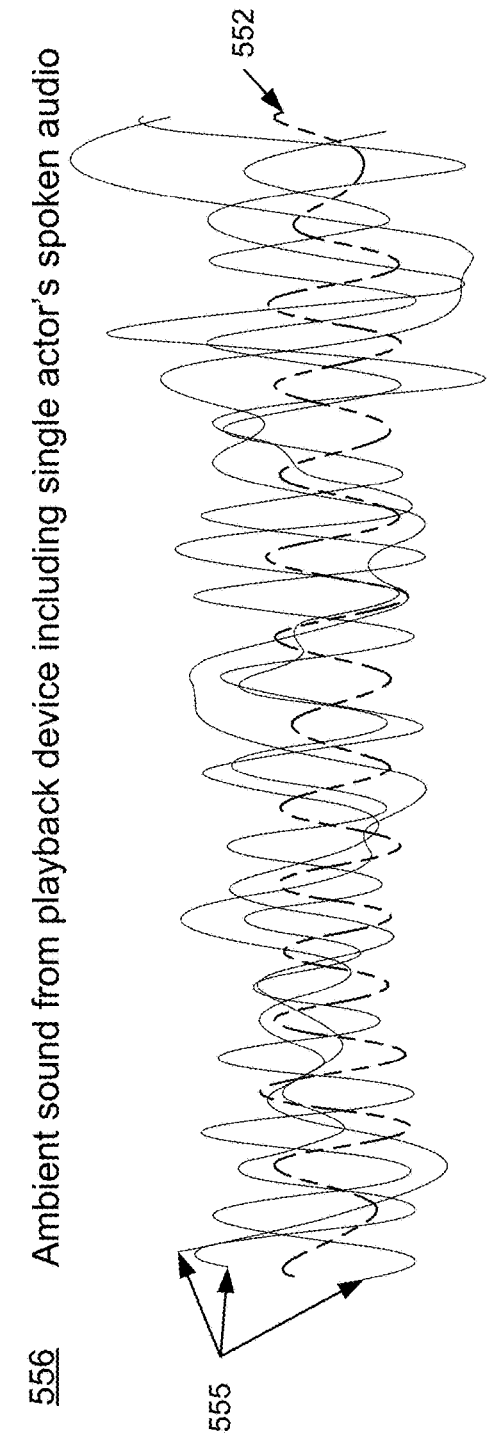
FIG. 5B

1200

1202 — Generate for display a user interface comprising a plurality of options for audio cancelation

1204 — Receive a selected option for audio cancelation

1206 — Retrieve the pre-generated inverse audio content based on the selected option for audio cancelation

1212 — Access user profile comprising at least one audio cancelation preference

1214 — Retrieve the pre-generated inverse audio content based on the at least one option for audio cancelation

FIG. 12B

SYSTEMS AND METHODS FOR PRE-GENERATED INVERSE AUDIO CANCELING

BACKGROUND

This disclosure is directed to systems and methods for audio cancelation.

SUMMARY

Audio or portions of audio played on a primary device (e.g., television or car stereo) may be found to be undesirable or inappropriate to listeners, or may "compete" when playing audio from alternate sources such as during a commercial substitution or during the broadcast of alternate audio streams. For example, a user or listener may find portions of audio inappropriate when watching a movie with a particular actor's voice, or a sports game with a particular commentator that the user dislikes. In such cases, it would be advantageous for the user to remove the particular actor's voice from the movie, or the particular commentator's voice from the sports game. In another example, audio or portions of audio may compete when there are multiple sources of audio, such as when a user watching television hears audio from a loudspeaker that provides corresponding audio for the television, and hears audio from personal headphones that provide personalized audio to the user.

In other scenarios, users may be viewing a television screen through extended reality (XR) headsets that include headphones or other speakers. For example, XR headsets may include augmented reality (AR), virtual reality (VR), and mixed reality (MR) head-mounted devices (HMDs). An advertisement may be played on the television screen to users viewing the screen without XR headsets or without modification from XR headsets. Each user viewing the television screen through an XR headset may be provided with a customized advertisement overlaying the advertisement playing on the television screen, and corresponding audio for the customized advertisement may be provided to the user via headphones of the XR headset. However, audio from the original advertisement (e.g., played through speakers coupled to the television screen or Bluetooth speakers) may still be heard by users wearing the XR headset. As an example, the television audio may "compete" with the customized headset audio. It would be advantageous for users with XR headsets to be provided with audio cancelation to silence the ambient audio of the original advertisement, while being provided with customized audio for the customized advertisement on their headphones for an improved user experience.

In one approach, multiple audio tracks may be encoded and delivered within a video stream or within an audio stream. For example, multiple audio tracks may include alternate language tracks or tracks designed to provide stereo or enhanced audio such as spatial audio. In one approach, active noise canceling may be used. For example, a pair of headphones or other speakers may be physically located near to a listener and the headphones or other speakers may include or have a corresponding microphone and computing component. These devices "listen" for audio signals (physical audio waves) that fall within either a given frequency domain or within a certain "noise" domain (e.g., based on amplitude). From the "heard" audio (physical audio waves), a derived inverse audio track which is 180 degrees out of phase (inverted) with respect to the "heard" audio may be played back, which when combined with the ambient ("heard") sound causes the "heard" sound to be "canceled" out. Generally, canceling or canceled out audio means and includes attenuating, suppressing, reducing, silencing, and eliminating audio, for example. Additionally, these active noise canceling (ANC) devices may attempt to allow audio which may fall within the frequency capabilities of the human voice to "pass thru" to the listener. In this way, noise is actively canceled but audio within the human voice range is allowed to be heard by the listener. An example of such an ANC device may be Apple's AirPods product in transparent mode. However, a user may desire to silence specific audio accompanied with a video stream or within an audio stream, and it would be advantageous to have the ability to differentiate differing, composed parts of an audio stream which can be dependent on the computing capabilities of the headphones themselves. For example, an audio stream of a video may include different parts such as human speakers, background noise, music soundtracks, or other parts.

To help address these problems, systems and methods are described herein for canceling audio using pre-generated inverse audio tracks (e.g., audio cancelation tracks). For example, users may "silence" specific audio playing on speakers near them (e.g., in their ambient environment) as part of a video stream (e.g., from services such as Netflix, Amazon Prime, or any suitable content provider video stream) or from streaming audio (e.g., from services such as iHeart Radio or Apple music, or any suitable streaming audio service). The disclosed approach enables a user to "cancel" or "silence" specific audio such as a particular song, group of songs (playlist), or a specific subset of an audio stream such as the spoken voice of a particular actor or group of actors within video or audio content.

The disclosed approach describes a system and method for pre-encoding inverse audio tracks. Inverse audio track(s) may be associated with a whole or part of a video or audio stream. As an example, a video or audio stream may include multiple voices. Inverse audio track(s) associated with the whole video or audio stream can be used to cancel the multiple voices of the whole stream. Inverse audio track(s) associated with a part of the video or audio stream, such as particular voice(s) can be used to cancel the particular voice(s) of the multiple voices. As another example, an audio stream may be a song. An inverse audio track associated with the whole audio stream can be used to cancel the whole song. An inverse audio track associated with a portion of the audio stream can be used to cancel the low-end base of the song. In some embodiments, inverse audio tracks may be associated with a whole or portion of source audio content or identified audio content played by a speaker to an ambient environment. Audio (e.g., inverse audio track(s) and/or audio accompanied with a video stream or audio stream) may be transmitted with metadata in such a way as to allow for the active noise cancelation (ANC) of an entire audio accompanied with a video stream or entire audio stream as well as a selected sub-portion thereof (as in the example of canceling out spoken word within audio content accompanied with a video content). This audio may be utilized along with a microphone (to be used to determine the amplitude of the audio to be canceled) to enable several use cases such as but not limited to: removing a particular actor's spoken audio from a video in order to allow language substitution without conflict; removing and replacing soundtrack material from a video to allow substitution without conflict; and actively canceling out arbitrary audio streams provided by services to allow a user to "silence" the audio (e.g., via headphones) while allowing other noise (such as background noise or human speech) to pass (remain). As an example, a service providing audio streams may be Apple Music or any suitable audio content provider.

In some embodiments, a computer system (e.g., using an audio cancelation application) may identify source audio content that a first device is playing via a first speaker. The system may retrieve pre-generated inverse audio content associated with the identified source audio content. The inverse audio content may comprise an inverse waveform of a source waveform of the identified source audio content. The system may modify at least a portion of the retrieved inverse audio content, and cause the modified inverse audio content to be played in synchronization with the identified source audio content to attenuate at least a portion of the source audio content that is playing via the first speaker. In some embodiments, the system may modify the retrieved inverse audio content and cause at least a portion of the modified inverse audio content to be played in synchronization with the identified source audio content. In some embodiments, the source audio content is to be played via the first speaker. For example, the identified audio content may be a playlist that includes source audio content to be played via the first speaker.

The system may generate for display a user interface comprising at least one option for audio cancelation, and the system may receive a selected option for audio cancelation. The system may retrieve the pre-generated inverse audio content based on the selected option for audio cancelation. The system may retrieve the pre-generated inverse audio content based on a user profile including at least one audio cancelation preference.

The system may perform identification of the audio content at the first device that is playing audio content via a first speaker, and the system may cause the modified inverse audio content to be played at the first speaker corresponding to the first device.

The system may cause at least the portion of the modified inverse audio content to be played to be performed by a second speaker corresponding to a second device. The system may identify the audio content based on a portion of the audio content detected by a microphone of the second device. The system may modify the retrieved inverse audio content by adjusting an amplitude of the retrieved inverse audio content based on an amplitude of the identified audio content detected by a microphone of the second device. The system may modify the retrieved inverse audio content by adjusting a phase of the retrieved inverse audio content based on a phase of the identified audio content detected by a microphone of the second device. The system may modify the retrieved inverse audio content based on audio characteristics of the first speaker of the first device. The system may modify the retrieved inverse audio content based on audio characteristics of the second speaker of the second device. The system may modify the retrieved inverse audio content based on a user hearing response profile.

In some embodiments, a system may identify source audio content that is to be played by a first device via a first speaker (e.g., audio content that is not currently playing via the first speaker). For example, the system may identify audio content that is to be played by the first device by using a playlist. The system may identify pre-generated inverse audio content associated with the identified source audio content. The inverse audio content may comprise an inverse waveform of a source waveform of the identified source audio content. The system may analyze an audio output of the identified audio content from the first speaker. The system may analyze the audio output to help modify the inverse audio content. Based at least in part on the analysis of the audio output, the system may modify at least a portion of the inverse audio content. The system may cause the modified inverse audio content to be played in synchronization with the identified audio content to attenuate at least a portion of the audio content. In some embodiments, the pre-generated inverse audio content associated with the identified source audio content comprises a voice of a single actor, and the identified source audio content comprises multiple voices.

As a result of the use of these techniques, users may silence specific audio within audio or video content.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 2B shows an illustrative example of an audio encoder that provides audio cancelation tracks as additional tracks for each channel, in accordance with some embodiments of this disclosure.

FIG. 5B-C shows an illustrative example of precise audio cancelation of a portion of original or source audio from a first device being canceled by inverse audio or a cancelation track from a second device, in accordance with some embodiments of this disclosure.

FIGS. 10, 11, 12A, 12B, 13 and 14 are flowcharts of detailed illustrative processes for audio cancelation, in accordance with some embodiments of this disclosure.

DETAILED DESCRIPTION

Figure 1A:
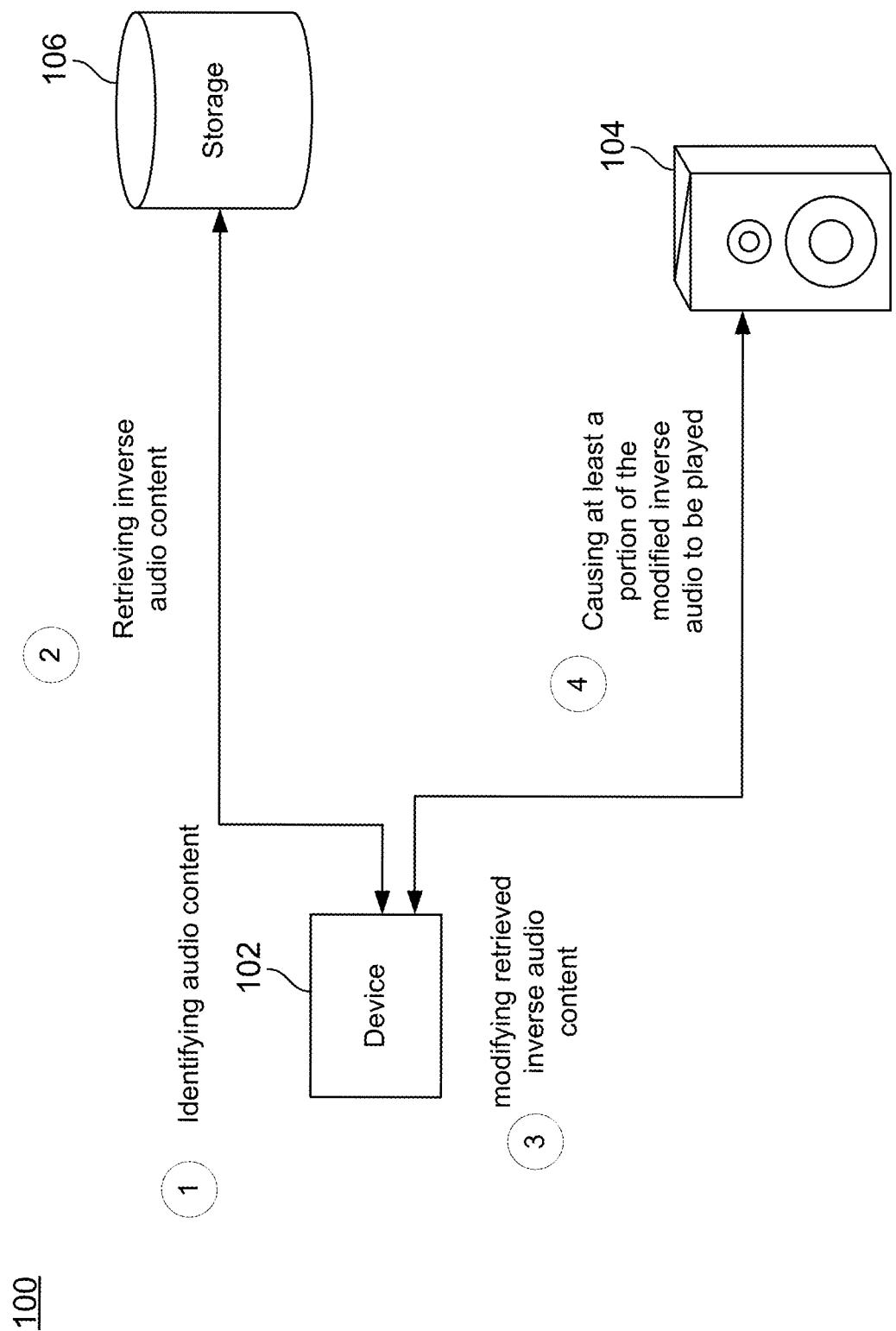
FIG. 1A shows an illustrative example of a system using pre-encoded inverse audio for audio cancelation of audio at a speaker corresponding to a device, in accordance with some embodiments of this disclosure.

During multimedia content creation (e.g., at an earliest or early point in production or at a later point using computer algorithms and higher processing capabilities), audio content either as a whole or in part of corresponding video content may be encoded as an audio stream for inclusion in or with a video stream. In some embodiments, multimedia content includes electronically consumable user assets, such as television programming, as well as pay-per-view programs, on-demand programs (as in video-on-demand (VOD) systems), Internet content (e.g., streaming content, downloadable content, Webcasts, etc.), video clips, audio, playlists, electronic books, social media, applications, games, discrete portions of video games bounded by saves of the game file, and/or any other media and/or combination of the same. In some embodiments, audio content is multiplexed with the video content into a single stream. In some embodiments, audio content can be multiplexed or time delivered as a separate stream from video content, and timing information is also provided and used to render the audio stream and video stream at proper times (e.g., relative to each other). In some embodiments, multimedia content is only audio content, and audio content is encoded as an audio stream. Either prior to streaming or in real time, the whole or part of an original audio stream may be inverted (the polarity of the original audio is inverted and 180 degrees out of phase from the original), such that when the inverted audio is mixed with the original audio, the perceived sound is "canceled" or silenced. The inverted audio content can be broadcast digitally as a separate transmission or within the original content as a separate channel (e.g., left, right, canceling-left, canceling-right).

In some embodiments, a first playback device such as a television speaker or a loudspeaker (e.g., external speaker) plays original audio content (e.g., external audio) to the ambient environment, and a second playback device such as headphones may be used to cancel out at least a portion of the external audio. In order to cancel out the external audio (e.g., if canceling out the spoken voice of actors in a multimedia content stream), a microphone or a plurality of microphones may "listen" to the original content, the volume (amplitude) of the external speakers may be calculated, and the directionality of the sound (e.g., audio amplitude based on left or right ear) may be detected in order to amplify or attenuate the pre-determined canceling audio tracks (e.g., inverted (original) audio content) to closely match that of the calculated amplitude (volume). To accomplish this, the inverted (original) audio content (e.g., noise canceling track, audio canceling track) may be pre-broadcast to arrive at the second playback device (e.g., headphones, or any suitable user device including a speaker) with sufficient time as to be transformed (in amplitude) before it is played simultaneously with the first playback device (e.g., from a TV or Bluetooth speaker or smart home assistant, any suitable user device including a speaker).

In the case of adaptive bitrate (ABR) content, the noise canceling audio (e.g., inverted audio content) may match that of the audio content (e.g., original audio content) that is encoded into the ABR stream in frequency, bitrate, and volume. In some embodiments, source audio content is encoded into the ABR stream at a particular frequency, bitrate, and volume. In some embodiments, the pre-generated inverse audio content associated with the source audio content is encoded at a same or similar frequency to match the particular frequency of the source audio content that was encoded for the ABR stream. In some embodiments, the pre-generated inverse audio content associated with the source audio content is encoded at a same or similar bitrate to match the particular bitrate of the source audio content that was encoded for the ABR stream. In some embodiments, the pre-generated inverse audio content associated with the source audio content is encoded at as same or similar volume or amplitude to match the particular volume or amplitude of the source audio content that was encoded for the ABR stream.

A second playback device (e.g., headphones, etc.) may be "paired" directly (e.g., via Bluetooth, any suitable communications technology) with a first playback device. A second playback device may be "paired" with an external device (not the first playback device), such as a mobile phone or tablet or smart home assistant which is aware of the audio playing on the first playback device either through metadata or through audio identification (e.g., Shazam app, any suitable audio identification application) and has the ability to transmit audio to the second playback device.

In the case where the second playback device is paired directly with the first playback device, there may be a user setting allowing the first playback device to send either the full audio to the second playback device or to enable the audio cancelation track to be sent to the second playback device. For example, the second playback device may be paired directly with the first playback device via Bluetooth or other suitable communications technology.

In the case where the second playback device is paired with an external device, such as a smartphone or smart home assistant, the external device may be informed or instructed to determine or identify the audio being played on the first playback device. The external device may be informed via a user identification of the audio, or via an automated audio identification application (e.g., the Shazam app), for example. The external device may further be instructed to request the audio cancelation track(s) from the first playback device or other external resource(s), such as but not limited to an audio content provider (e.g., Apple music or other suitable audio content provider) or other resource reachable via the Internet or transmitted via RF (radio) or other suitable communications technology.

The disclosed approaches may be used not only for canceling audio coming from a TV but also from other audio sources where the audio content can be determined and an audio canceling track can be retrieved by a second playback device. In some embodiments, other audio sources include a car radio or a movie theater. In some embodiments, a second playback device includes a car radio or a movie theater sound system. In some cases, audio may be identified via an application on a smart phone (e.g., Shazam or other suitable audio identification application). In the case where there is integration between devices, such as an Apple HomePod streaming Apple music and a user wearing Apple AirPods, in a common area (e.g., a university dormitory or food court) a user may selectively choose to filter ambient audio (e.g., music) by accessing a setting on their iPhone without any other input.

FIG. 1A shows an illustrative example of a system 100 using pre-encoded inverse audio for audio cancelation of an audio output at a speaker that corresponds to a device, in accordance with some embodiments of this disclosure. The system of FIG. 1A includes a device 102, speaker 104, and storage 106. Although FIG. 1A shows the device 102, speaker 104, and storage 106 as separate components, in some embodiments the speaker 104 and/or storage 106 may be included in the device 102.

The device 102 may be a television, a mobile phone, a personal computer, an extended reality (XR) headset or head-mounted device (HMD), etc. In some embodiments, device 102 is any of the user equipment devices 800 or 801 of FIG. 8 or any of the user equipment devices 903, 907, 908, 909, or 910 of FIG. 9. The speaker 104 may be a speaker that is separate from but corresponding to the device 102 (e.g., personal headphones or a loudspeaker communicatively coupled to the device). The speaker 104 may be integrated with the device 102 (e.g., a speaker in a television, mobile phone, personal computer, XR headset, etc.). In some embodiments, speaker 104 is any of the example audio output equipment 814 of FIG. 8. The storage 106 may be cloud storage, storage for a content provider, or local on the device 102.

At step 1, device 102 may identify original audio content (e.g., source audio content) being played or to be played via the speaker 104. For example, device 102 may receive original audio and/or visual content from a content provider, and may identify the original audio content by accessing metadata associated with the received original audio and/or visual content. Device 102 may identify original audio content from identification information provided from the content provider. Device 102 may identify original audio content from a playlist that the device 102 maintains, or accesses, and knows what is currently playing or that will be played from the playlist.

At step 2, device 102 may retrieve inverse audio content from storage 106. In some embodiments, device 102 may be playing original content that is stored on the device, and may have the inverse audio content stored on the device (e.g., storage 106 is local storage). In some embodiments, device 102 receives inverse audio content from a content provider and device 102 may store the received inverse audio content in local storage. In some embodiments, device 102 requests the inverse audio content from a content provider, and storage 106 may be the storage of the content provider.

At step 3, device 102 may modify the retrieved inverse audio content. For example, device 102 may adjust an amplitude and/or phase of the inverse audio signal. In the example of FIG. 1A, a same speaker (e.g., speaker 104) may be playing the original audio content and the inverse audio content to provide audio cancelation, and device 102 may modify the retrieved inverse audio content by adjusting an amplitude and/or a phase of the inverse audio signal to compensate for an amplitude and/or phase of the played original audio content. In some embodiments, the inverse audio content is adjusted in amplitude (e.g., multiplied by a constant number) to modify the inverse audio content to an appropriate decibel level so that it cancels the corresponding original audio content when being played by the same speaker. In some embodiments, the inverse audio content is adjusted in phase so that the original audio content and the inverse audio content are aligned (e.g., positions of respective sound waves are aligned) so that the inverse audio content cancels the audio content when being played by the same speaker. Additional details about modifying the retrieved inverse audio content may be found in the description of FIG. 13.

At step 4, device 102 may cause at least a portion of the modified inverse audio to be played. In the example of FIG. 1A, the modified inverse audio is played at the speaker 104 which is playing the original audio. In an example use case, a user watching a sports program may not want to hear commentary from a particular commentator. The user may indicate a preference to cancel out or remove the audio from the particular commentator. The user preference may be indicated via user interface input or via stored user profile preference, for example. In response to the user preference, the device 102 may cause a portion of the modified inverse audio (e.g., inverse audio of the commentator's audio portion) to be played with the original audio including the commentator's audio portion to cancel out the commentator's audio. For example, the device 102 may combine the audio content signal with the portion of modified inverse audio content signal to be played at the speaker 104. The other audio of the sports program (e.g., another commentator's audio, noise from the game, etc.) played from speaker 104 may continue to be present as audio signals that are not canceled by the portion of the modified inverse audio content signal.

As another example, a portion of audio content may be canceled (e.g., by playing modified inverse audio) and a replacement audio content may be added (e.g., to replace the canceled audio). For example, the audio content to be removed may be one actor's voice speaking in one language, and the audio content to be added is another or the same actor's voice in another language.

Figure 1B:
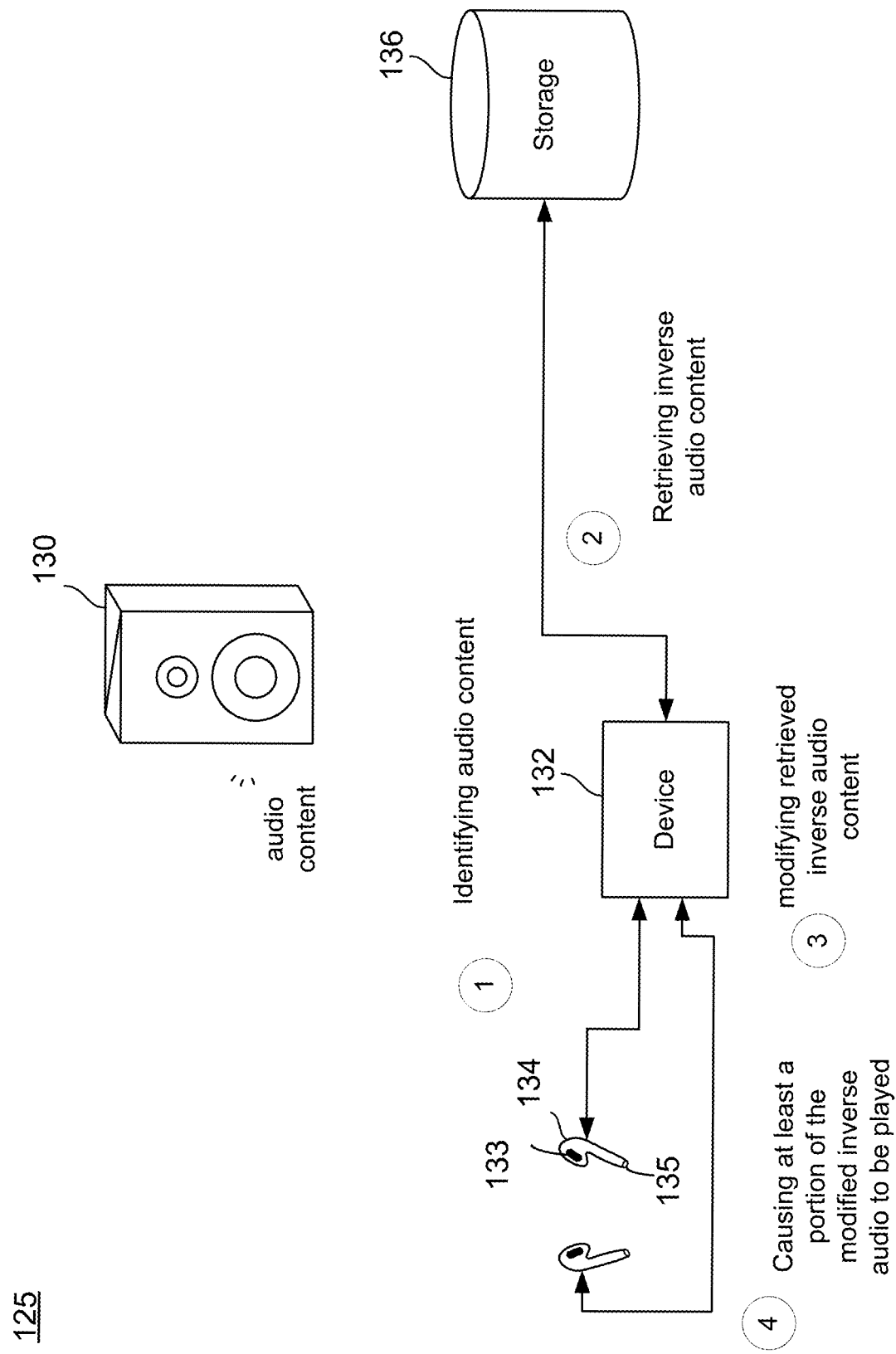
FIG. 1B shows an illustrative example of a system to cancel audio being played from a first speaker by using pre-encoded inverse audio being played from a second speaker, in accordance with some embodiments of this disclosure.

FIG. 1B shows an illustrative example of a system 125 to cancel audio being played from a first speaker by using pre-encoded inverse audio being played from a second speaker, in accordance with some embodiments of this disclosure. The system of FIG. 1B includes a first speaker 130, from which original audio content (e.g., source audio content) is being played to the ambient environment, and a second speaker 133 of headphones 134, which includes a microphone 135. In this embodiment, the second speaker 133 plays inverse audio content (e.g., at least an inverse audio cancelation track). The system of FIG. 1B also includes device 132 and storage 136, either or both of which may be integrated into headphones 134. In some embodiments, device 132 may be another device (e.g., a smartphone) that is communicatively coupled to the headphones 134 (e.g., via Bluetooth).

Figure 8:
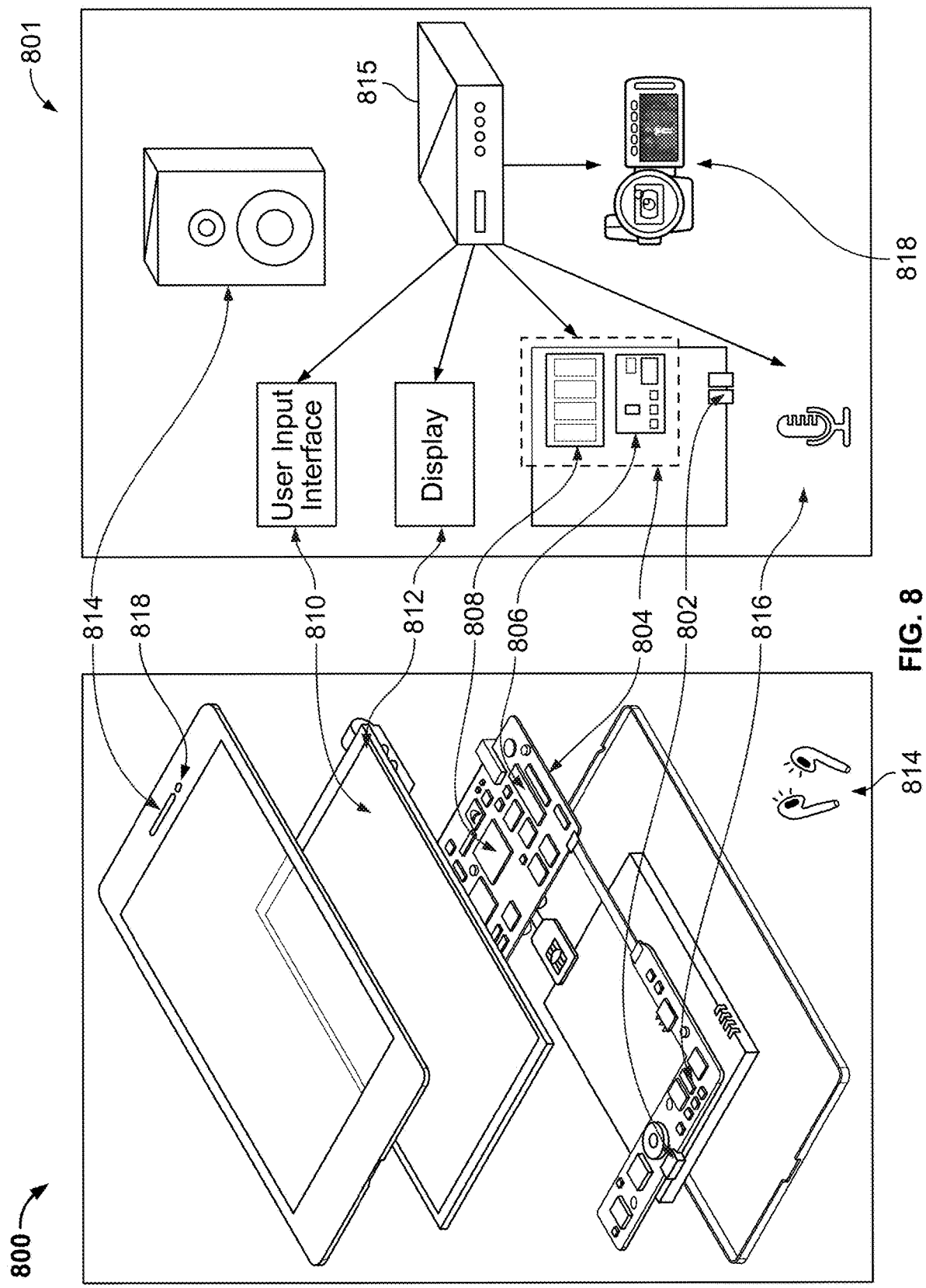
FIG. 8 shows an illustrative user equipment device, in accordance with some embodiments of this disclosure.
Figure 9:
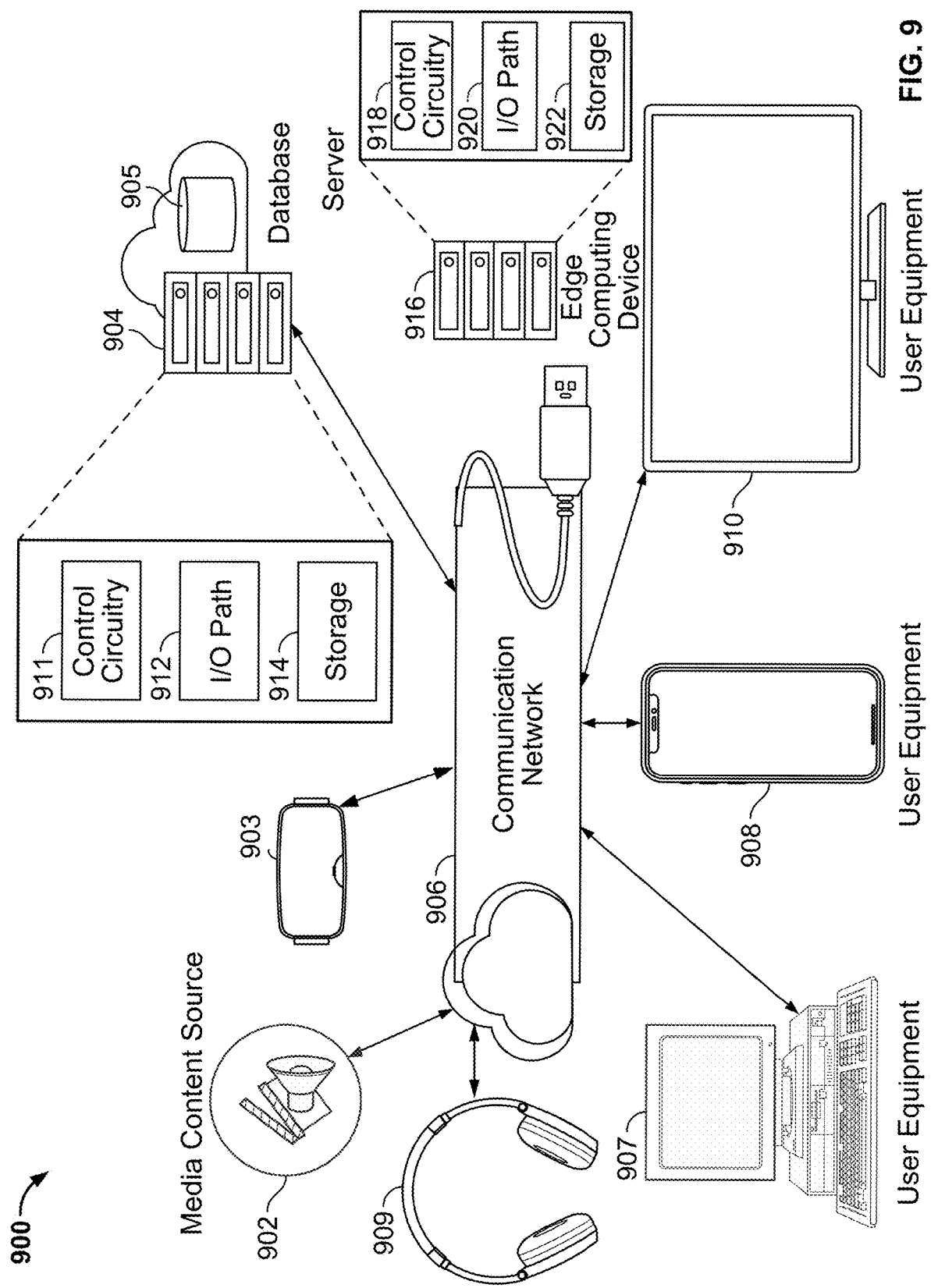
FIG. 9 shows an example system, in accordance with some embodiments of this disclosure.

In some embodiments, the device 132 is any of the user equipment devices 800 or 801 of FIG. 8 or any of the user equipment devices 903, 907, 908, 909, or 910 of FIG. 9. In some embodiments, the device 132 may be a television, a mobile phone, a personal computer, headphones, XR headset, etc. In some embodiments, speaker 130 is communicatively coupled to the device 132. For example, device 132 may be communicatively coupled to both speaker 130 and speaker 133. In some embodiments, speaker 130 and/or speaker 133 is any of the example audio output equipment 814 of FIG. 8. In some embodiments, speaker 130 and/or speaker 133 is a speaker that is separate from but corresponding to the device 132 (e.g., loudspeaker, personal headphones, etc. communicatively coupled to the device). In some embodiments, speaker 130 and/or speaker 133 is integrated with the device 132 (e.g., speaker for a television, mobile phone, personal computer, headphones, XR headsets, etc.). In some embodiments, speaker 130 corresponds to another device and is not communicatively coupled to device 132. The storage 106 may be cloud storage, storage for a content provider, or local on the device 102.

At step 1, device 132 may identify the original audio content being played or to be played via the first speaker 130. In some embodiments, device 132 may have access to the identification of original audio content being played at first speaker 130. For example, a device associated with speaker 130 or a content provider providing the original audio content to speaker 130 may share identification of the original audio content to device 132. For example, a user associated with device 132 may have permission to access a playlist of another user, device, or venue, or the information may be made publicly available, etc. In another example, device 132 may have access to or control original audio content being played at first speaker 130. In some embodiments, device 132 may identify the original audio content by using an audio identification application running on a smartphone. For example, a microphone 135 of headphones 134 receives or detects ambient audio content (e.g., source or original audio content). An audio identification application (e.g., of a smartphone) analyzes the detected source audio content to identify audio being played in the ambient environment from first speaker 130.

At step 2, device 132 may retrieve inverse audio content from storage 136. In some embodiments, device 132 may have inverse audio content stored locally (e.g., storage 136 is local storage). In some embodiments, device 132 receives inverse audio content from a content provider and device 132 may store the received inverse audio content in local storage. In some embodiments, device 132 requests the inverse audio content from a content provider, and storage 136 may be the storage of the content provider and/or cloud storage.

At step 3, device 132 may modify the retrieved inverse audio content. For example, device 132 may adjust amplitude or phase of the inverse audio signal. Additional details about modifying the retrieved inverse audio content may be found in the description of FIG. 13. In the example of FIG. 1B, a second speaker 133 may play the inverse audio content to provide audio cancelation of the original audio content of the first speaker 130. Device 132 may modify the retrieved inverse audio content by adjusting an amplitude and/or a phase of the inverse audio signal to compensate for an amplitude and/or phase of the played original audio content as detected by microphone 135 (e.g., using inverse audio filtering). In some embodiments, a microphone of the device 132 (e.g., a built in microphone 135 of headphones 134) measures a decibel level of the original audio content played from the first speaker 130, and the device 132 modifies the inverse audio content to be output at the second speaker 133 of headphones 134 at the appropriate level to cancel the original audio content from the first speaker 130. In some embodiments, the device 132 modifies the amplitude of the inverse audio content by multiplying each sample amplitude of the inverse audio content by a corresponding constant number so that the amplitude of the modified inverse audio content cancels a corresponding sample amplitude of the audio content from the measured sound wave (original audio content as played by first speaker 130) by microphone 135. In some embodiments, a microphone 135 of headphones 134 may measure a phase of the original audio content played by first speaker 130, and the device 132 modifies inverse audio content to be adjusted in phase so that the original audio content and the inverse audio content are aligned (e.g., position of respective sound waves are aligned) so that the inverse audio content when being played by the second speaker (speaker 133 of headphones 134) cancels the original audio content of the first speaker 130. For example, device 132 may adjust a time at which the inverse audio content is played at second speaker 133 so that the modified inverse audio aligns with the original audio content played at first speaker 130 to cancel each other out. The modification of the retrieved inverse audio content may be based on audio characteristics of the first speaker 130, the audio characteristics of the second speaker 133, and/or a user hearing response profile.

At step 4, device 132 may cause at least a portion of the modified inverse audio to be played. In the example of FIG. 1B, the modified inverse audio is played at the speaker 133 to cancel the original audio content or a portion of the original audio content from speaker 130 which is providing the original audio output. In an example use case, a user watching a sports program may not want to hear commentary from a particular commentator. The user may indicate a preference to cancel out or remove the audio from the particular commentator. The user preference may be indicated via user interface input or via stored user profile preference, for example. In response to the user preference, the device 132 may cause a portion of the modified inverse audio (e.g., inverse audio of the commentator's audio portion) to played with the original audio including the commentator's audio portion at speaker 133 to cancel out the commentator's audio in the original audio content that is played at speaker 130. The other audio of the sports program (e.g., another commentator's audio, noise from the game, etc.) played from speaker 130 may continue to be heard by the user wearing headphones 134 as those audio signals are not canceled by the portion of the modified inverse audio content signal.

As another example, entire audio content may be canceled. For example, the audio content being played at speaker 130 may be a particular song that a user may not like listening to. The user may indicate a preference to cancel out the audio to the particular song when it is being played. The device 102 may cause the modified inverse audio of the particular song to be played at second speaker 133 to cancel out the song being played at the speaker 130. In some embodiments, a user may indicate a preference to cancel out the audio of a playlist that is being played. The device 102 may cause the modified inverse audio of particular songs of a playlist to be played at second speaker 133 to cancel out the song being played from the playlist at the first speaker 130.

As another example, a portion of audio content may be canceled (e.g., by playing modified inverse audio) and a replacement audio content may be added (e.g., to replace the removed audio). For example, the audio content to be removed may be one actor's voice in one language, and the audio content to be added is the same or another actor's voice in a different language.

As another example, entire audio content may be removed and replaced with replacement audio content. For example, when viewing a TV screen with other viewers, a particular viewer may wear an XR headset with speakers. During a commercial, a customized or personalized advertisement is overlaid over the original advertisement on the TV screen, as seen through the XR headset, to provide the customized advertisement to a user. The audio portion of the default advertisement is removed by playing modified inverse audio at the second speaker 133 to cancel out the audio from the first speaker 130. Replacement audio content may be added (e.g., to replace the removed audio) that corresponds to the customized advertisement to the user.

Figure 2A:
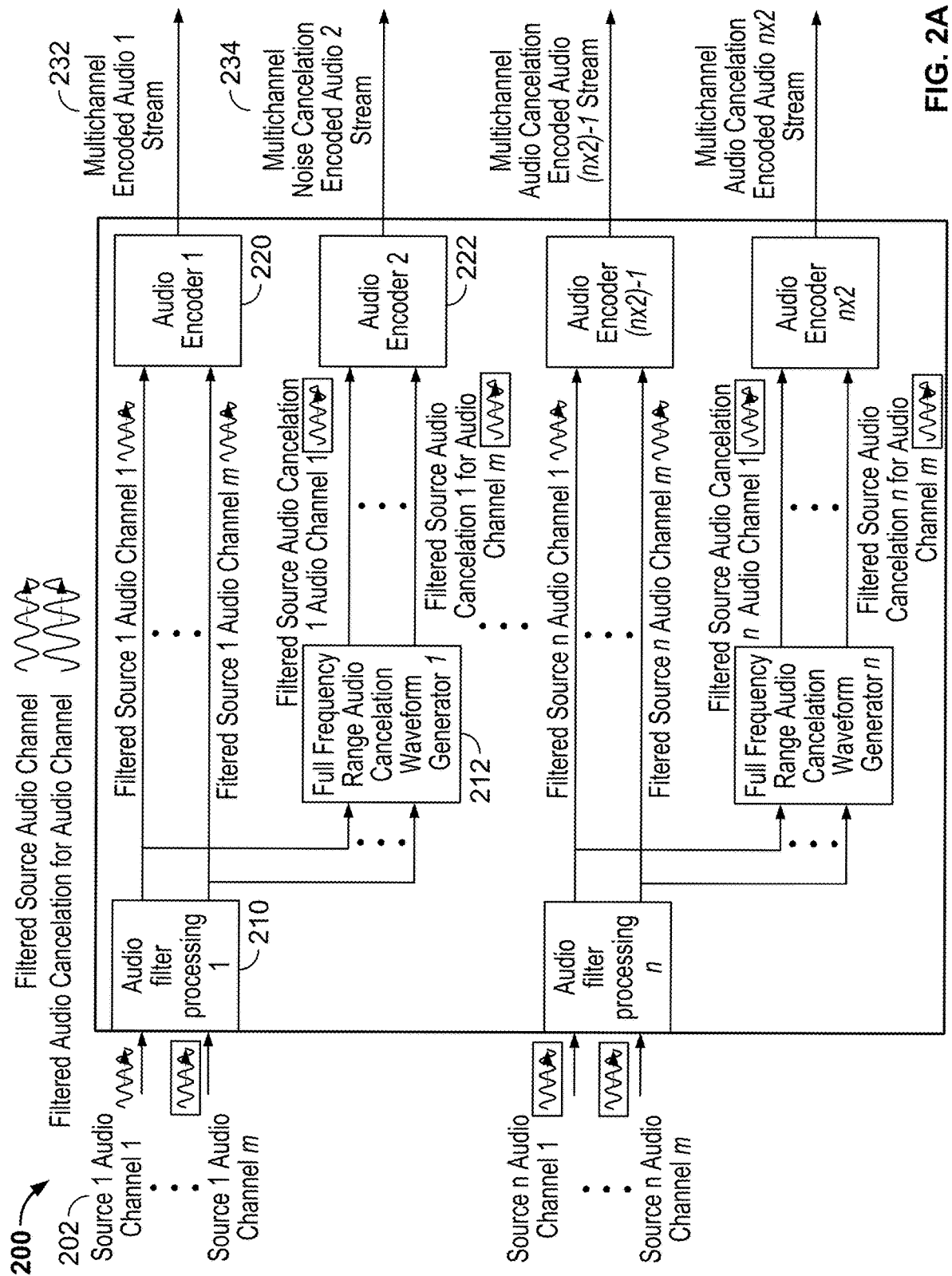
FIG. 2A shows an illustrative example of an audio encoder that provides audio cancelation tracks as additional streams, in accordance with some embodiments of this disclosure.

FIG. 2A shows an illustrative example 200 of an audio encoder that provides audio cancelation tracks as additional streams, in accordance with some embodiments of this disclosure. An audio encoder may include an audio cancelation generator (e.g., generator blocks 212). An inverse audio wave may be generated based on the source audio wave. In the architecture of example 200, there are multiple audio encoders (e.g., audio encoder 1 to nx2) for encoding the different source audios (e.g., source 1 audio channels 1 to m, . . . , source n audio channels 1 to m). The audio sources can be different language tracks or a director's commentary track, for example. These audio sources may be formatted for mono, stereo, or multichannel surround. Audio filter processing block 210 may filter the incoming audio channels 202 by applying additional processing, such as equalization of frequencies, spatial audio processing, volume leveling, etc. . . . The output of the filter processing may be sent to the audio encoder 220 (e.g., audio encoder 1). The output of audio encoder 220 (e.g., audio encoder 1) may be a multichannel encoded audio stream 232 (e.g., multichannel encoded audio 1 stream). The output of the filter processing may also be sent to the full range audio cancelation waveform generator 212 (e.g., full frequency range audio cancelation waveform generator 1). The full range audio cancelation waveform generator 212 generates in real-time an audio cancelation signal covering the full range of frequencies from the incoming audio channels. The audio cancelation audio for each channel of audio is sent to a second audio encoder 222 (e.g., audio encoder 2). The output of the second audio encoder 222 (e.g., audio encoder 2) may be a multichannel audio cancelation encoded audio stream 234 (e.g., multichannel audio cancelation encoded audio 2 stream). This processing may be repeated for each incoming audio source. The device in this case may play the demultiplexed audio cancelation stream for the corresponding demultiplexed audio stream.

FIG. 2B shows an illustrative example 250 of an audio encoder that provides an audio cancelation tracks as additional tracks for each channel, in accordance with some embodiments of this disclosure. In contrast to the example 200 of FIG. 2A which shows an audio encoder that provides audio cancelation tracks as additional streams, the example 250 of FIG. 2B shows an audio encoder that provides audio cancelation tracks as additional tracks for each channel. In this case, for each incoming audio channel, a corresponding audio cancelation channel is generated.

In some embodiments, the audio sources 202 and audio filter processing 210 of FIG. 2A corresponds to the audio sources 252 and audio filter processing 260 of FIG. 2B. The output of the audio filter processing 260 (e.g., audio filter processing 1) is input to a pass-thru 261 (e.g., pass-thru 1) and a full frequency range audio cancelation waveform processing 262 (e.g., full frequency range audio cancelation waveform processing 1) either via pass-thru 261 or directly input (although connections are not shown in FIG. 2B). The output of the pass-thru 261 and the output of the full frequency range audio cancelation waveform processing 262 is sent to audio encoder 272 (e.g., audio encoder 1). The output of audio encoder 272 is a multichannel encoded audio stream 282 (e.g., multichannel encoded audio 1 stream including audio cancelation channels 1 through m) that includes audio cancelation channels.

Figure 3A:
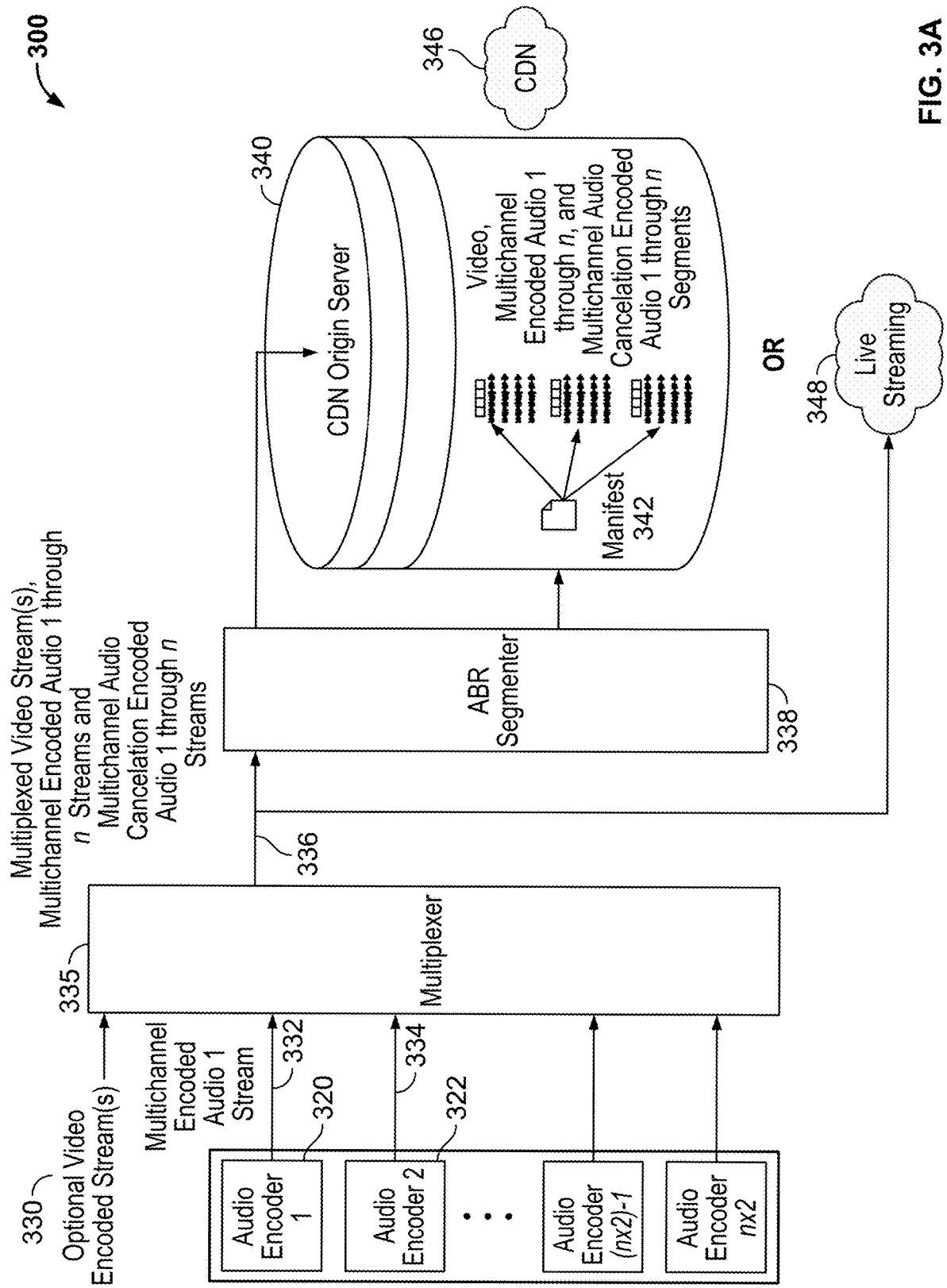
FIG. 3A shows an illustrative example of streaming or distributing audio streams where audio streams with audio cancelation tracks as additional streams are multiplexed into a single stream, in accordance with some embodiments of this disclosure.

FIG. 3A shows an illustrative example 300 of streaming or distributing audio streams where audio streams with corresponding audio cancelation streams are multiplexed into a single stream, in accordance with some embodiments of this disclosure. In some embodiments, the audio encoders 320 and 322 of FIG. 3A correspond to (e.g., is similar to, is the same as) audio encoders 220 and 222 of FIG. 2A. Video stream(s) 330 (e.g., optional video encoded streams), audio streams 332 (e.g., multichannel encoded audio 1, 3, . . . (nx2)−1 streams) with the corresponding audio cancelation streams 334 (e.g., multichannel encoded audio 2, 4, . . . , nx2 streams) may be multiplexed (e.g., via multiplexer 335) into single stream 336 (e.g., multiplexed video streams(s), multichannel encoded audio 1 through n streams, and multichannel audio cancelation encoded audio 1 through n streams). The figure shows both a live stream approach 348 and an adaptive bit rate (ABR) distribution approach via a content distribution network (CDN) 346. The multiplexed single stream 336 may be input into an ABR segmenter 338. One or more outputs of the ABR segmenter may be input to a CDN origin server 340. A manifest 342 in the CDN origin server 340 includes video, multichannel encoded audio 1 through n segments, and multichannel audio cancelation encoded audio 1 through n segments. In the live streaming case, a client device may perform a join or connect to the transmitting network address represented as a URL/address:port. In the ABR case, a client device may download the multiplexed segments based on the ABR client device's bandwidth estimation. The audio stream may be played through the playout audio renderer (language, directors' comments, etc.) and the audio cancelation stream may be rendered through a secondary device (headphones) connected via a cable or select Bluetooth devices identified to only receive the audio cancelation track.

Figure 3B:
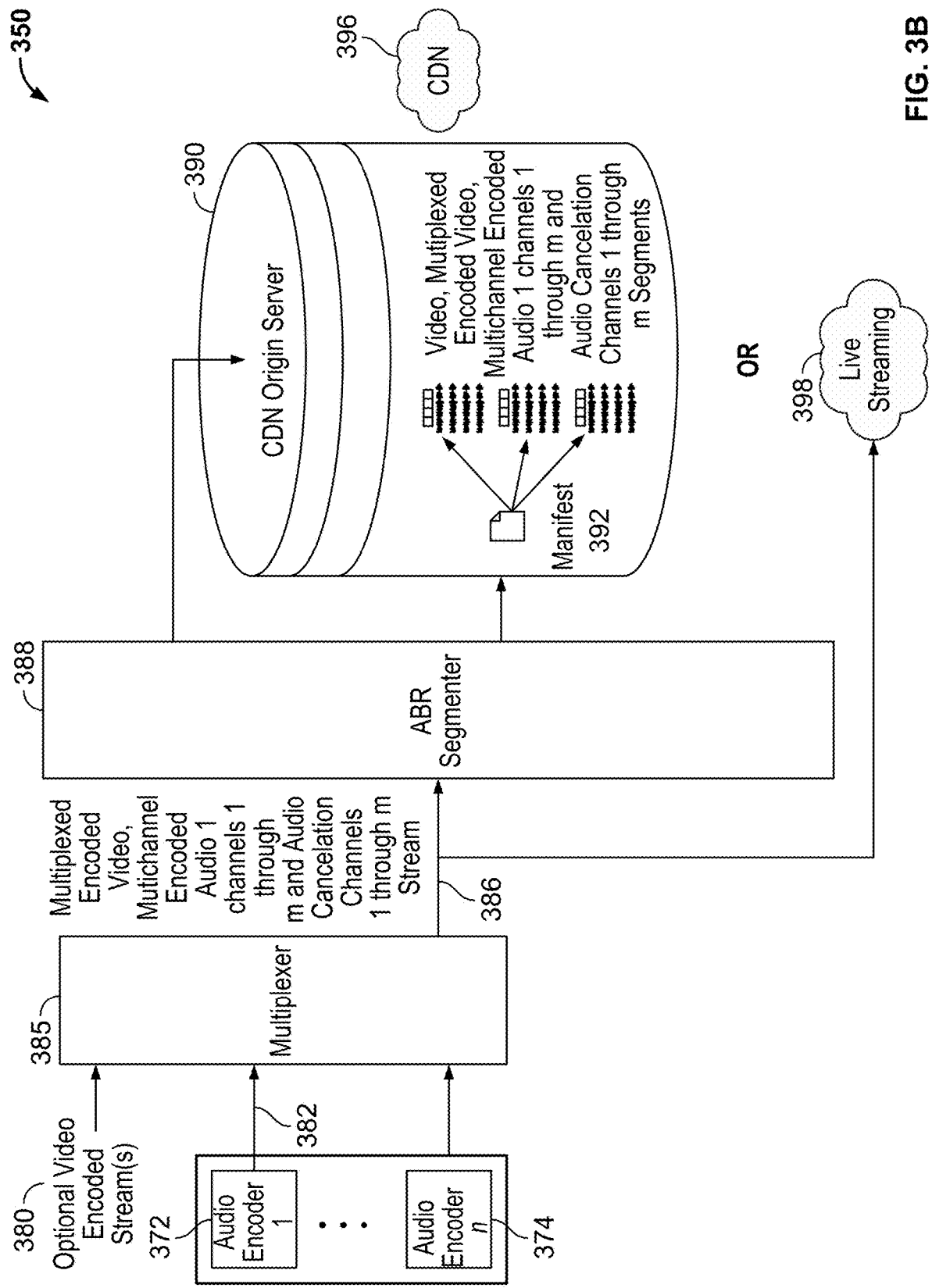
FIG. 3B shows an illustrative example of streaming or distributing audio streams where audio streams with audio cancelation tracks as additional tracks for each channel are multiplexed into a single stream, in accordance with some embodiments of this disclosure.

FIG. 3B shows an illustrative example 350 of streaming or distributing audio streams where audio streams with corresponding audio cancelation channels are multiplexed into a single stream, in accordance with some embodiments of this disclosure. In some embodiments, the audio encoders 372 and 374 of FIG. 3A correspond to audio encoders 272 and 274 of FIG. 2A. Video stream(s) 380 (e.g., optional video encoded stream(s)), audio streams with the corresponding audio cancelation channels 382 (e.g., multichannel encoded audio stream 1 including audio cancelation channels 1 through m, . . . , multichannel encoded audio stream n including audio cancelation channels 1 through m) may be multiplexed (e.g., via multiplexer 385) into single stream 386. The figure shows both a live stream approach 398 and an ABR distribution approach 396. The multiplexed single stream 386 may be input into an ABR segmenter 388. One or more outputs of the ABR segmenter 388 may be input to a CDN origin server 390. A manifest 392 in the CDN origin server 390 includes video, multiplexed encoded video, and multichannel encoded audio 1 channels 1 through m and audio cancelation channels 1 through m segments. In the live streaming case, the client device may perform a join or connect to the transmitting network address represented as a URL/address:port. In the ABR case, the client device may download the multiplexed segments based on the ABR client device's bandwidth estimation. The audio channels may be played through the playout audio renderer (language, director's comments, etc.) and the audio cancelation channels may be rendered through a secondary device (headphones) connected via a cable or select Bluetooth devices identified to only receive the audio cancelation track.

Figure 4A:
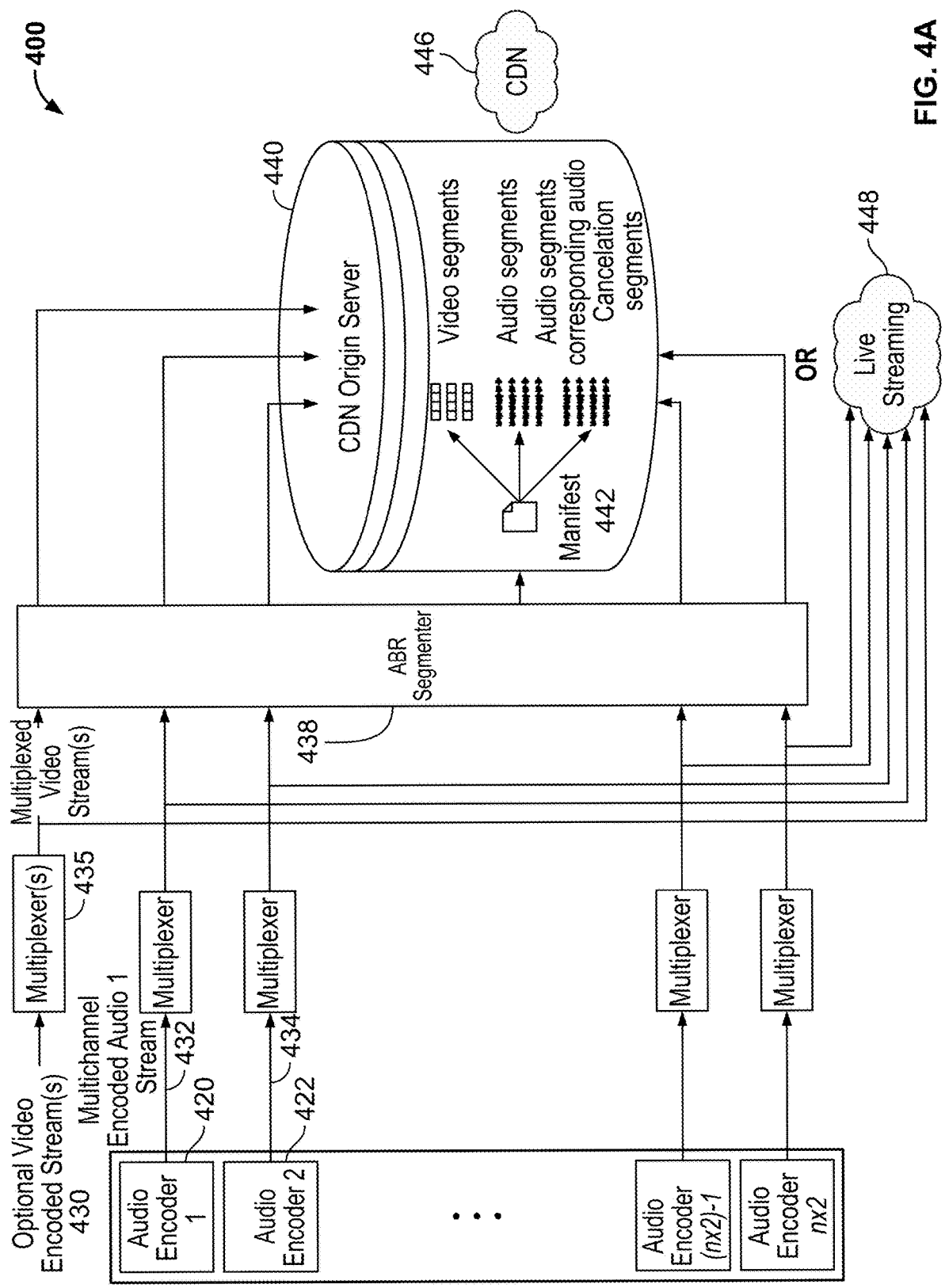
FIG. 4A shows an illustrative example of streaming or distributing audio streams where audio streams with audio cancelation tracks as additional streams are multiplexed into separate streams, in accordance with some embodiments of this disclosure.

FIG. 4A shows an illustrative example of streaming or distributing audio streams where audio streams with corresponding audio cancelation streams are multiplexed into separate streams, in accordance with some embodiments of this disclosure. In some embodiments, the audio encoders 420 and 422 of FIG. 4A correspond to (e.g., is similar to, is the same as) audio encoders 220 and 222 of FIG. 2A. Video stream(s) 430 (e.g., optional video encoded stream(s)), audio streams 432 with the corresponding audio cancelation channels 434 may be multiplexed (e.g., via multiplexer(s) 435) into separate streams. FIG. 4A shows both a live stream approach 448 and an ABR distribution approach 446. The multiplexed video streams are input into the ABR segmenter 438. One or more outputs of the ABR segmenter 438 may be inputs to a CDN origin server 440. In the live streaming case, if the content includes video, the client device may perform a join or connect to the video transmitting network address represented as a URL/address:port. The client device may perform a join or connect to the audio transmitting network address represented as a URL/address:port for audio. The client device may perform a join or connect to the audio cancelation address corresponding to the joined audio address represented as a URL/address:port for audio cancelation audio. In the ABR case, if video is represented in the manifest 442, the client device may download the multiplexed video segments. A manifest 442 in the CDN origin server 440 may include video segments, audio segments and audio segments corresponding to audio cancelation segments. The client device may download the multiplexed audio segments for the audio playout as selected by the user (language, director's commentary, etc.). The client device may download the multiplexed audio cancelation audio segments corresponding to the audio track. The audio segments may be rendered through the playout audio renderer and the audio cancelation segments may be rendered through a secondary device (headphones) connected via a cable or select Bluetooth devices identified to receive the audio cancelation track. As in ABR, encoded bitrate segments may be determined by the client device.

Figure 4B:
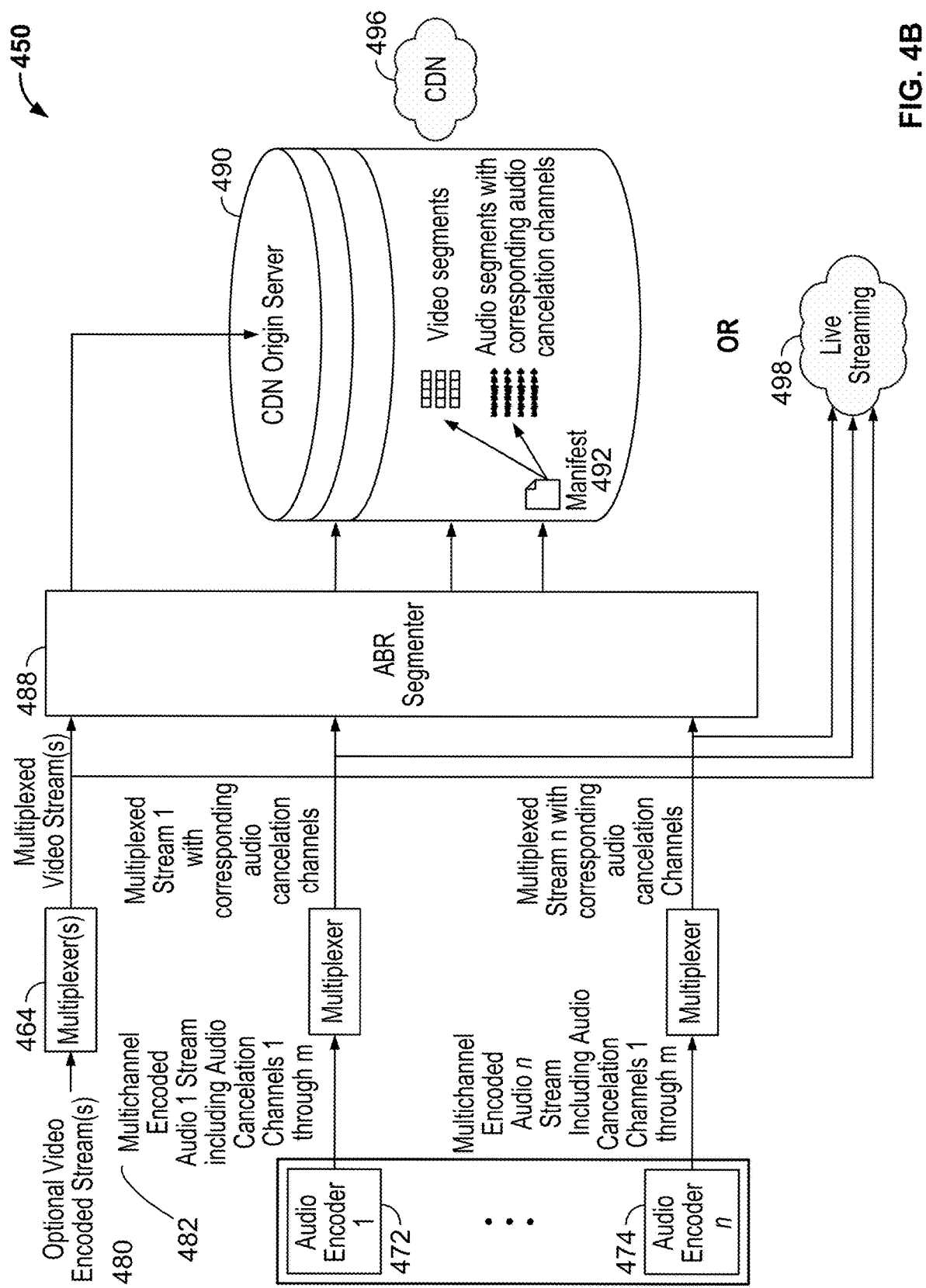
FIG. 4B shows an illustrative example of streaming or distributing audio streams where audio streams with audio cancelation tracks as additional tracks for each channel are multiplexed into separate streams, in accordance with some embodiments of this disclosure.

FIG. 4B shows an illustrative example of streaming or distributing audio streams where audio streams with corresponding audio cancelation channels are multiplexed into separate streams, in accordance with some embodiments of this disclosure. In some embodiments, the audio encoders 472 and 474 of FIG. 4B correspond to audio encoders 272 and 274 of FIG. 2A. Video stream(s) 480 (e.g., optional video encoded stream(s)) and audio streams with the corresponding audio cancelation channels 482 (e.g., multichannel encoded audio 1 stream including audio cancelation channels 1 through m, . . . , multichannel encoded audio n stream including audio cancelation channels 1 through m) may be multiplexed (e.g., via multiplexer(s) 464) into separate streams. FIG. 4B shows both a live stream approach and an ABR distribution approach. The multiplexed video streams are input into the ABR segmenter 488. One or more outputs of the ABR segmenter 488 may be input to a CDN origin server 490. In the live streaming case, if the content includes video, the client device may perform a join or connect to the video transmitting network address represented as a URL/address:port. The client device may perform a join or connect to the audio transmitting network address represented as a URL/address: port for audio. In the ABR case, if video is represented in the manifest, the client device may download the multiplexed video segments. A manifest 492 in the CDN origin server 490 may include video segments and audio segments with corresponding audio cancelation channels. The client device may download the multiplexed audio segments for the audio playout as selected by the user (language, director's commentary, etc.). The audio channels will be rendered through the playout audio renderer and the audio cancelation channels may be rendered through a secondary device (headphones) connected via a cable or select Bluetooth devices identified to only receive the audio cancelation track. As in ABR, encoded bitrate segments may be determined by the client device.

Figure 5A:
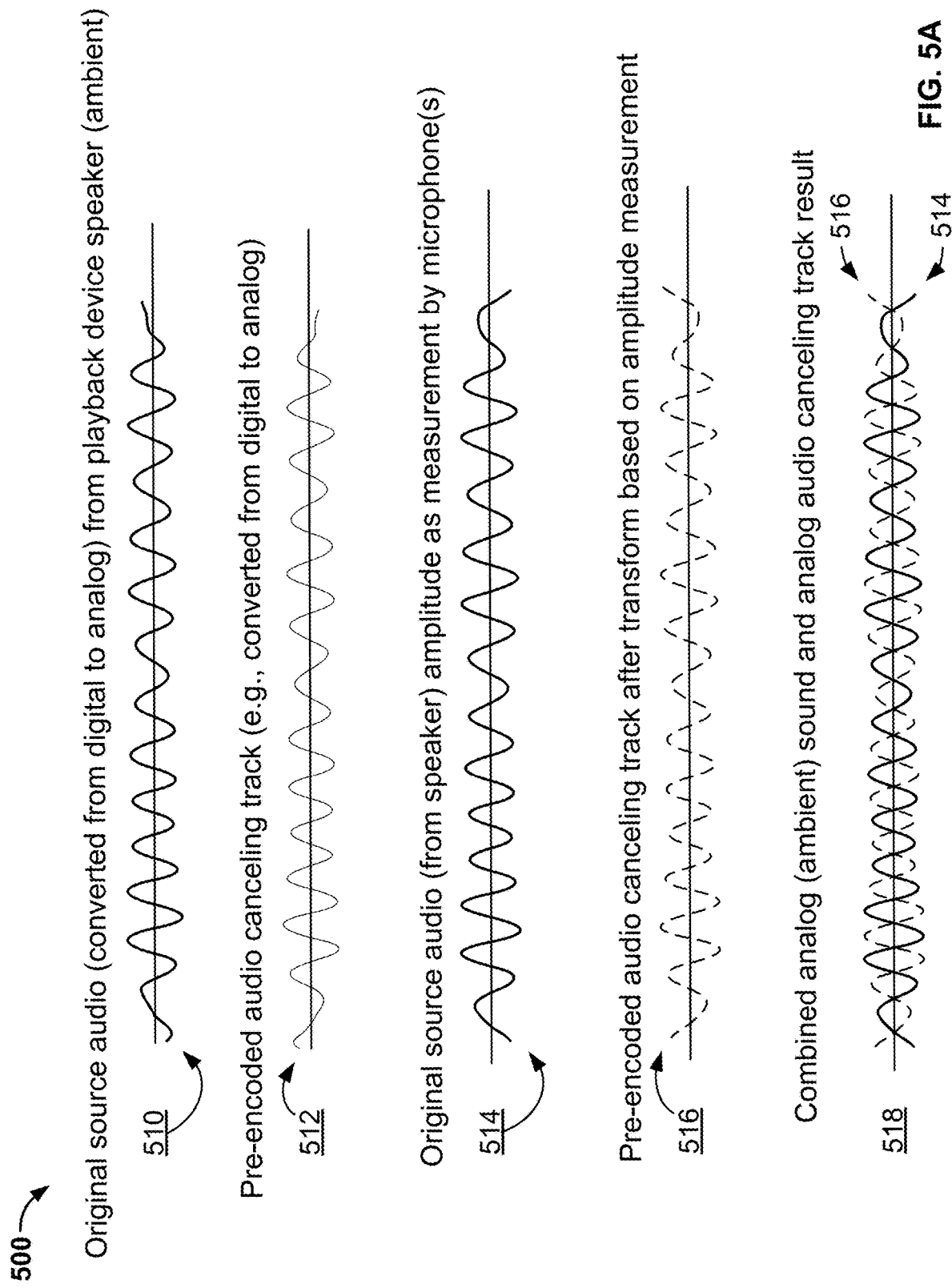
FIG. 5A shows an illustrative example of precise audio cancelation of original or source audio from a first device being canceled by inverse audio or a cancelation track from a second device, in accordance with some embodiments of this disclosure.

FIG. 5A shows an illustrative example 500 of precise audio cancelation of original or source audio from a first device being canceled by inverse audio or a cancelation track from a second device, in accordance with some embodiments of this disclosure. In some embodiments, the first device is a loudspeaker playing or producing a source audio output in an ambient environment, and the second device is headphones playing or producing an inverse audio corresponding to the source audio output. In this example, waveform 510 is an original source audio (converted from digital to analog) from a playback device speaker playing in an ambient environment. Waveform 512 is a pre-encoded audio canceling track (converted from digital to analog) that corresponds to the original source audio. Waveform 514 is the original source audio amplitude from the loudspeaker, as measured by microphone(s). Waveform 516 is the pre-encoded audio canceling track (waveform 512) after being transformed based on an amplitude measurement of waveform 514. Waveforms 518 is a resulting waveform from combining the analog (ambient) sound and analog audio canceling track. For example, waveforms 518 include the waveform 514 for the original source audio amplitude from the speaker as measured by microphone(s), and the pre-encoded audio canceling track 516 after being transformed based on the amplitude measurement.

Figure 5C:
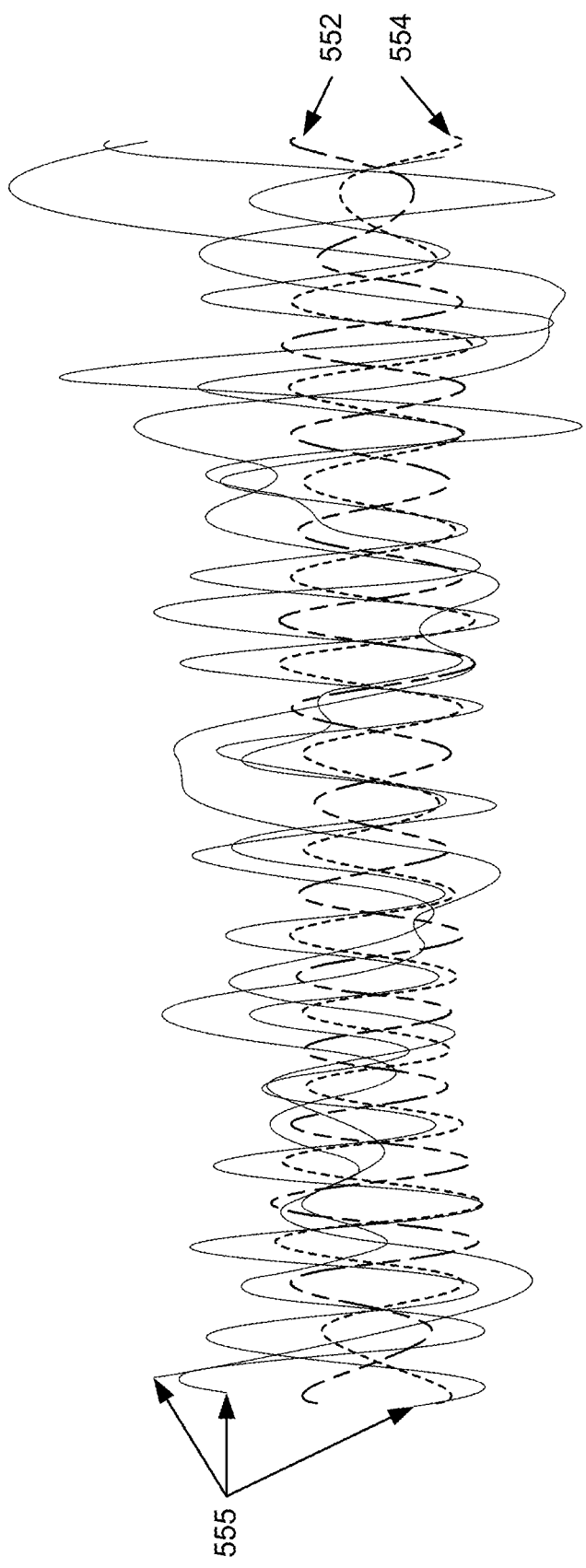

FIGS. 5B-C shows an illustrative example 550 of precise audio cancelation of a portion of original or source audio from a first device being canceled by inverse audio or a cancelation track from a second device, in accordance with some embodiments of this disclosure. In some embodiments, the first device is a loudspeaker playing or producing source audio output in an ambient environment, and the second device is headphones playing or producing an inverse audio corresponding to the source audio output. In some embodiments, the portion of audio is a single actor's spoken audio. In FIG. 5B, waveform 552 may be a single actor's spoken audio (converted from digital to analog). For example, the single actor's spoken audio may be an encoded digital signal that is converted to an analog signal. The single actor's spoken audio may be isolated during the original recording, or may be isolated before encoding the original recording to a digital signal. Waveform 554 may be a single actor's spoken audio canceling track (e.g., converted from digital audio canceling track). Waveforms 556 may be ambient sound from playback device including the single actor's spoken audio. For example, waveforms 556 includes ambient audio waveforms 555 and the single actor's spoken audio waveform 552. In FIG. 5C, waveforms 558 is the resulting sound waves from playback device (ambient sound) combined in headphones with audio canceling waves. For example, waveforms 558 include ambient audio waveforms 555 with the single actor's audio waveform 552 and the single actor's audio canceling track 554.

Figure 6A:
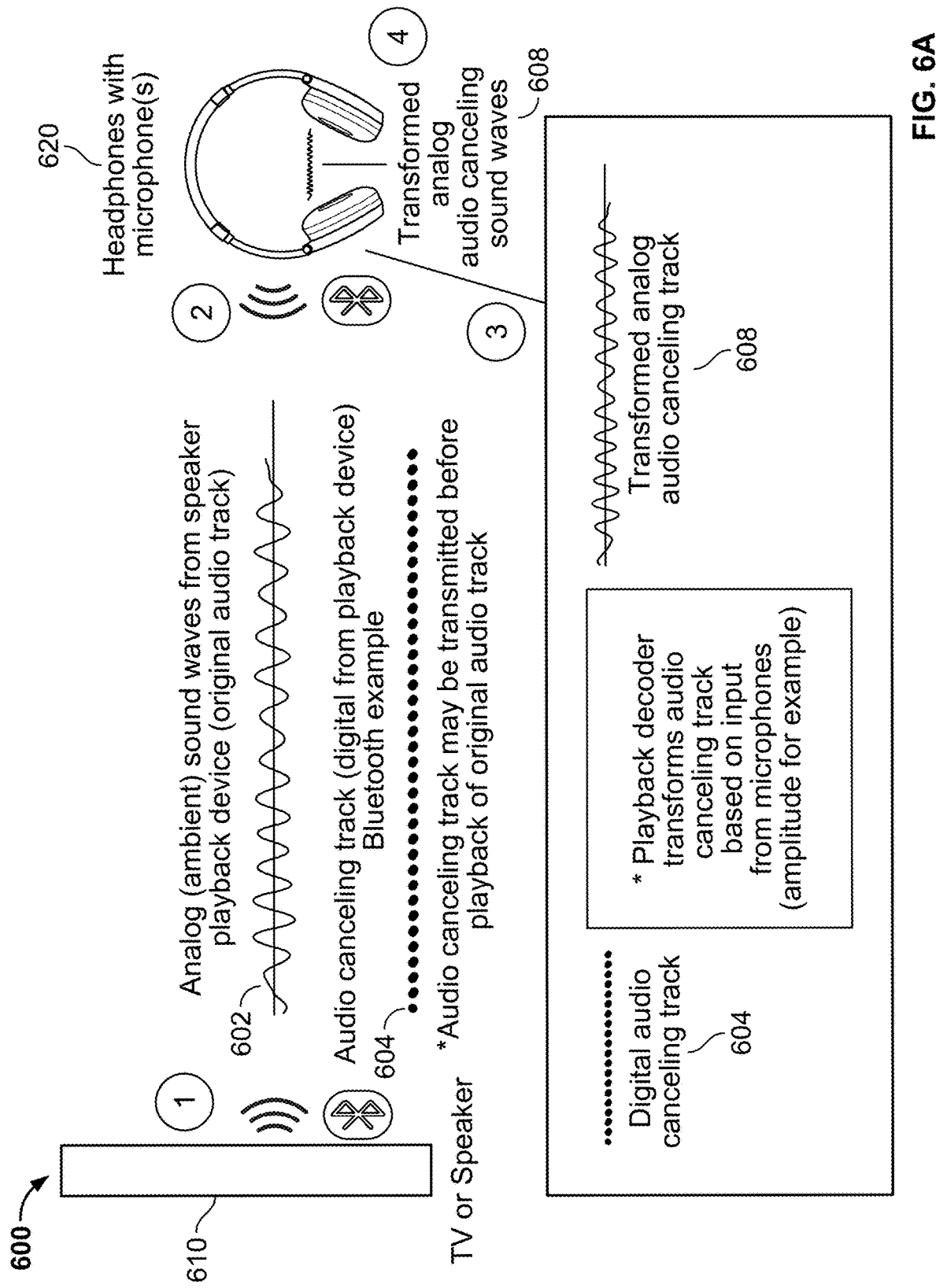
FIG. 6A shows an illustrative example of transmission of analog audio and a digital audio cancelation track from a first device to a second device for audio cancelation at the second device, in accordance with some embodiments of this disclosure.

FIG. 6A shows an illustrative example 600 of transmission of analog audio and a digital audio cancelation track from a first device to a second device for audio cancelation at the second device, in accordance with some embodiments of this disclosure. In some embodiments, the first device is a speaker playback device, and the second device is headphones with microphone(s). FIG. 6A shows transmission of both the analog sound from a first playback device (such as a TV or a Bluetooth speaker, etc.) and the digital audio cancelation track where the analog sound is received by microphone(s) on the second playback device and the digital audio cancelation track is transformed (based on the input from the microphone(s)) and played on the second playback device resulting in the cancelation of the audio originating from the first playback device.

For example, at step 1, a speaker playback device 610 (e.g., TV, speaker, etc.) transmits analog (ambient) sound waves 602 and a digital audio canceling track 604. The analog (ambient) sound waves 602 may be an original audio track. The speaker playback device 610 may transmit the analog (ambient) sound waves 602 by playing original audio track to ambient environment. The speaker playback device 610 may transmit the digital audio canceling track 604 (e.g., via Bluetooth, etc.). At step 2, the microphones of the headphones 620 receives the analog (ambient) sound waves 602 from the speaker playback device 610, and the headphones 620 receives the digital audio canceling track 604 via Bluetooth. At step 3, a playback decoder of the headphones 620 transforms the digital audio canceling track 604 based on input from microphones (e.g., amplitude of the played original audio track) to generate transformed analog audio canceling track 608. At step 4, the headphones 620 plays the transformed analog audio canceling sound waves 608 to cancel the audio from the first device, in accordance with some embodiments of this disclosure.

Figure 6B:
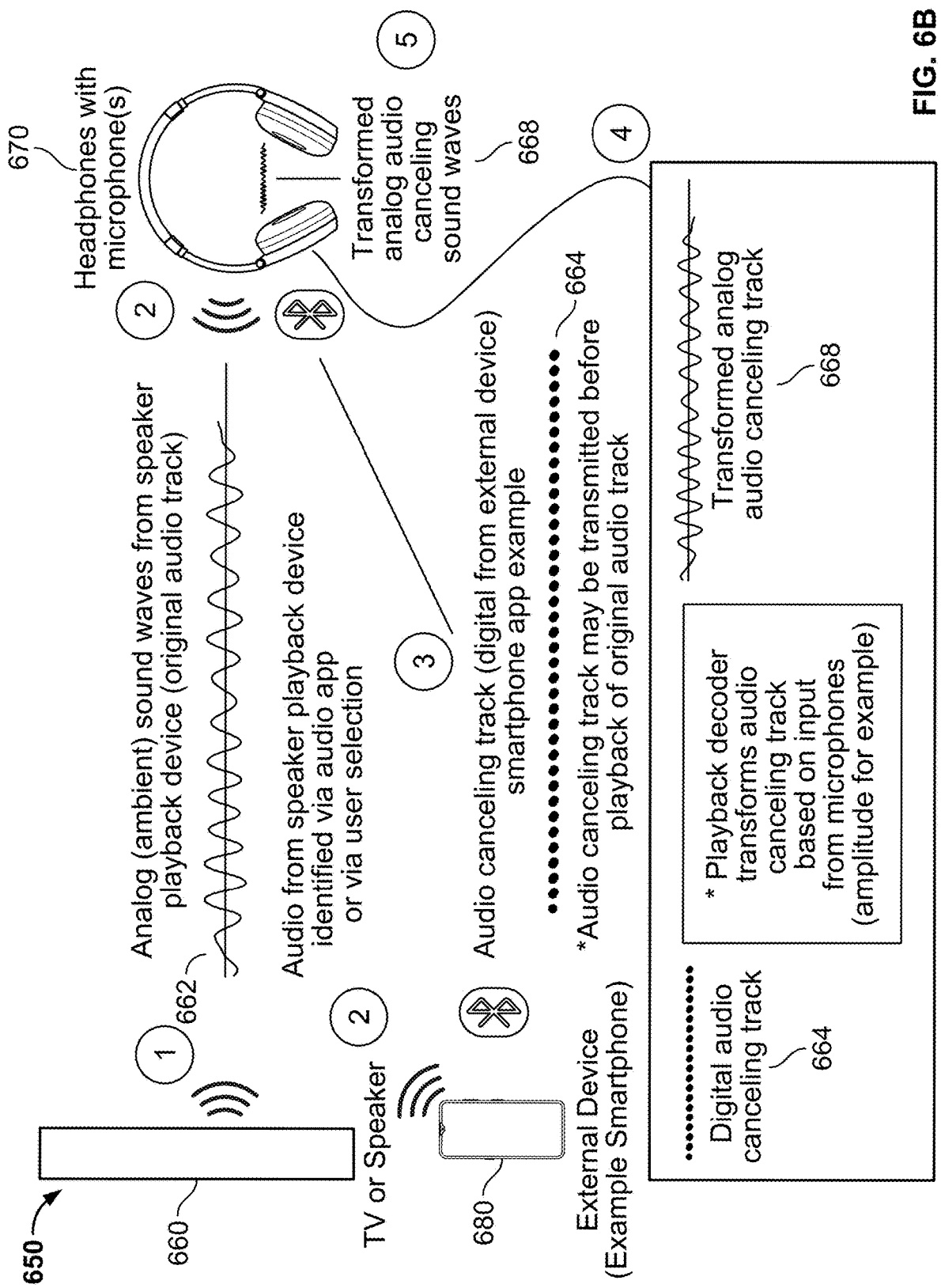
FIG. 6B shows an illustrative example of transmission of analog audio from a first device to a second device, and identification of the analog audio at a third device to access a digital audio cancelation track for audio cancelation at the second device, in accordance with some embodiments of this disclosure.

FIG. 6B shows an illustrative example 650 of transmission of analog audio from a first device to a second device, and identification of the analog audio at a third device to provide a digital audio cancelation track for audio cancelation at the second device, in accordance with some embodiments of this disclosure. In some embodiments, the first device is a speaker playback device, and the second device is headphones with microphone(s). FIG. 6B shows the transmission of the analog sound from a first playback device (such as a TV or Bluetooth speaker) received by microphone(s) on a second playback device. In some embodiments, the third device may be an external device. An application or process on an external device (such as a smartphone) may identify a digital audio cancelation track. The external device may transmit the digital audio cancelation track to the second playback device. The second playback device may transform the digital audio cancelation track (based on the input from the microphone(s)) and play the transformed digital audio cancelation track resulting in the cancelation of the audio originating from the first playback device.

For example, at step 1, a speaker playback device 660 (e.g., TV, speaker, etc.) transmits analog (ambient) sound waves 662. The analog (ambient) sound waves 662 may be an original audio track. The speaker playback device 660 may transmit the analog (ambient) sound wayes 662 by playing original audio track to ambient environment. At step 2, the audio from the speaker playback device 660 is received by microphone(s) of headphones 670, and the external device 680 identifies the audio via an audio application or via user selection at external device 680 (e.g., smartphone). For example, a smartphone may receive the audio via one or more microphones, and may use an audio application (e.g., Shazam or any suitable audio identification application) to identify the audio. In some embodiments, the smartphone may receive a user input via a user interface (e.g., user interface of FIG. 7) to identify the audio. The smartphone may retrieve or access the digital audio canceling track. At step 3, the smartphone may transmit the audio canceling track via Bluetooth to the headphones 670. The headphones 670 receive the digital audio canceling track 664 (e.g., via Bluetooth, etc.). At step 4, a playback decoder of the headphones 670 transforms the digital audio canceling track 664 based on input from microphones (e.g., amplitude) to generate transformed analog audio canceling track 668. At step 5, the headphones 670 plays the transformed analog audio canceling sound waves 668 to cancel the audio from the speaker playback device 660, in accordance with some embodiments of this disclosure.

In some embodiments, the digital audio canceling track 604 of FIG. 6A and/or the digital audio canceling track 664 of FIG. 6B may be sent via any suitable communication path (e.g., communication path of communication network 906 described of FIG. 9).

Figure 7:
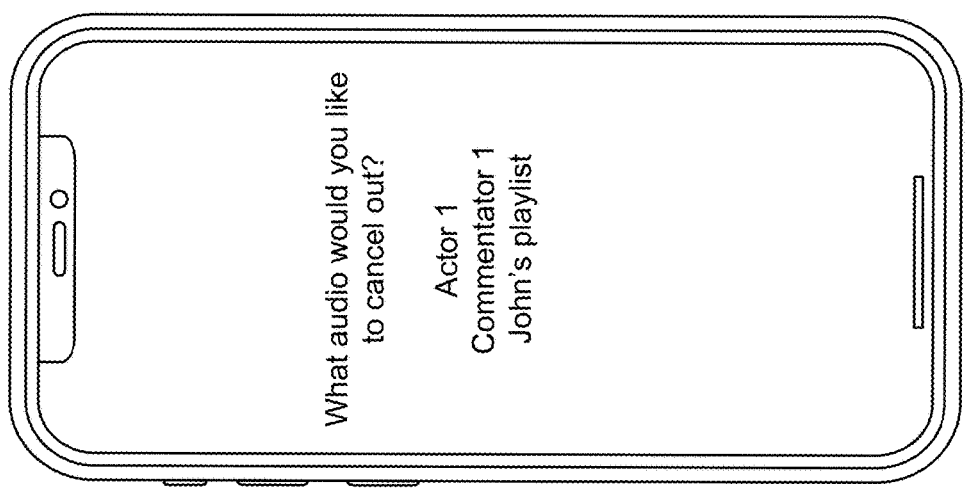
FIG. 7 shows an illustrative example of a user interface for selecting options for audio cancelation, in accordance with some embodiments of this disclosure.

FIG. 7 shows an illustrative example of a user interface for selecting options for audio cancelation, in accordance with some embodiments of this disclosure. For example, the user interface may ask a user "What audio would you like to cancel out?" The user interface may provide options for the user, such as "Actor 1," "Commentator 1," and "John's playlist." A user may select one or more options for audio cancelation. For example, a user may select "John's playlist" and identify that the audio to be canceled is from a playlist that is being played in the environment. The smartphone may have access to John's playlist, which may include the inverse cancelation audio tracks. The smartphone may transmit the inverse audio cancelation tracks to headphones communicatively coupled to the smartphone. In some embodiments, although not shown in FIG. 7, the user interface comprises at least one option for audio customization. For example, the user interface may provide only a single option for audio customization. The audio customization may be audio cancelation or replacement of an audio track. For example, the user interface may provide a single option may be to cancel audio from a playlist that is being played. As another example, the user interface may have multiple options for replacing spoken audio content with different language options.

FIGS. 8-9 depict illustrative devices, systems, servers, and related hardware for pre-generated inverse audio cancelation. FIG. 8 shows generalized embodiments of illustrative user equipment devices 800 and 801. For example, user equipment device 800 may be a smartphone device, a tablet, a virtual reality or augmented reality device, or any other suitable device capable of processing video and audio data. In another example, user equipment device 801 may be a user television equipment system or device. User television equipment device 801 may include set-top box 815. Set-top box 815 may be communicatively connected to microphone 816, audio output equipment (e.g., speaker or headphones 814), and display 812. In some embodiments, display 812 may be a television display or a computer display. In some embodiments, set-top box 815 may be communicatively connected to user input interface 810. In some embodiments, user input interface 810 may be a remote-control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 800 and user equipment device 801 may receive content and data via input/output (I/O) path (e.g., circuitry) 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 8 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., device 800), a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the audio cancelation application stored in memory (e.g., storage 808). Specifically, control circuitry 804 may be instructed by the audio cancelation application to perform the functions discussed above and below. In some implementations, processing or actions performed by control circuitry 804 may be based on instructions received from the audio cancelation application.

In client/server-based embodiments, control circuitry 804 may include communications circuitry suitable for communicating with a server or other networks or servers. The audio cancelation application may be a stand-alone application implemented on a device or a server. The audio cancelation application may be implemented as software or a set of executable instructions. The instructions for performing any of the embodiments discussed herein of the audio cancelation application may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the audio cancelation application may be a client/server application where only the client application resides on device 800 (e.g., device 104), and a server application resides on an external server (e.g., server 904 and/or server 916). For example, the audio cancelation application may be implemented partially as a client application on control circuitry 804 of device 800 and partially on server 904 as a server application running on control circuitry 911. Server 904 may be a part of a local area network with one or more of devices 800 or may be part of a cloud computing environment accessed via the internet. In a cloud computing environment, various types of computing services for performing searches on the internet or informational databases, providing pre-generated inverse audio cancelation capabilities, providing storage (e.g., for a database) or parsing data (e.g., using machine learning algorithms described above and below) are provided by a collection of network-accessible computing and storage resources (e.g., server 904 and/or edge computing device 916), referred to as "the cloud." Device 800 may be a cloud client that relies on the cloud computing capabilities from server 904 to determine whether processing (e.g., at least a portion of virtual background processing and/or at least a portion of other processing tasks) should be offloaded from the mobile device, and facilitate such offloading. When executed by control circuitry of server 904 or 916, the audio cancelation application may instruct control 911 or 918 circuitry to perform processing tasks for the client device and facilitate the pre-generated inverse audio cancelation.

Control circuitry 804 may include communications circuitry suitable for communicating with a server, edge computing systems and devices, a table or database server, or other networks or servers. The instructions for carrying out the above mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as audio cancelation application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include audio and/or video generating circuitry and tuning circuitry, such as one or more analog tuners, one or more MPEG-2 decoders or other digital decoding circuitry, high-definition tuners, or any other suitable tuning or audio and/or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment device 800, 801 to receive and to display, to play, or to record content. The tuning and encoding circuitry may also be used to receive audio and/or video data for pre-generated inverse audio cancelation. The circuitry described herein, including for example, the tuning, audio and/or video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment device 800, the tuning and encoding circuitry (including multiple tuners) may be associated with storage 808. In some embodiments, audio encoding formats include MP3, AAC, HE-AAC, FLAC, AC3, etc.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user equipment device 800 and user equipment device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The audio cancelation application may be implemented using any suitable architecture. For example, it may be a stand-alone application wholly-implemented on each one of user equipment device 800 and user equipment device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide pre-generated inverse audio cancelation functionality and perform any of the actions discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the audio cancelation application is a client/server-based application. Data for use by a thick or thin client implemented on each one of user equipment device 800 and user equipment device 801 may be retrieved on-demand by issuing requests to a server remote to each one of user equipment device 800 and user equipment device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to device 800 for presentation to the user.

In some embodiments, the audio cancelation application may be downloaded and interpreted or otherwise run by an interpreter or virtual machine (run by control circuitry 804). In some embodiments, the audio cancelation application may be encoded in the ETV Binary Interchange Format (EBIF), received by control circuitry 804 as part of a suitable feed, and interpreted by a user agent running on control circuitry 804. For example, the audio cancelation application may be an EBIF application. In some embodiments, the audio cancelation application may be defined by a series of JAVA-based files that are received and run by a local virtual machine or other suitable middleware executed by control circuitry 804. In some of such embodiments (e.g., those employing MPEG-2 or other digital media encoding schemes), audio cancelation application may be, for example, encoded and transmitted in an MPEG-2 object carousel with the MPEG audio and video packets of a program. In some embodiments, audio encoding formats include MP3, AAC, HE-AAC, FLAC, AC3, etc.

FIG. 9 is a diagram of an illustrative system 900 for pre-generated inverse audio cancelation, in accordance with some embodiments of this disclosure. User equipment devices 903, 907, 908, 909, 910 (e.g., which may correspond to one or more of computing device may be coupled to communication network 906). Communication network 906 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 906) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 906.

System 900 may comprise media content source 902, one or more servers 904, and one or more edge computing devices 916 (e.g., included as part of an edge computing system). In some embodiments, the audio cancelation application may be executed at one or more of control circuitry 911 of server 904 (and/or control circuitry of user equipment devices 903, 907, 908, 909, 910 and/or control circuitry 918 of edge computing device 916). In some embodiments, data may be stored at database 905 maintained at or otherwise associated with server 904, and/or at storage 922 and/or at storage of one or more of user equipment devices 903, 907, 908, 909, 910.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide pre-generated inverse audio data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

Edge computing device 916 may comprise control circuitry 918, I/O path 920 and storage 922, which may be implemented in a similar manner as control circuitry 911, I/O path 912 and storage 924, respectively of server 904. Edge computing device 916 may be configured to be in communication with one or more of user equipment devices 903, 907, 908, 909, 910 and server 904 over communication network 906, and may be configured to perform processing tasks (e.g., pre-generated inverse audio cancelation) in connection with ongoing processing of video data. In some embodiments, a plurality of edge computing devices 916 may be strategically located at various geographic locations, and may be mobile edge computing devices configured to provide processing support for mobile devices at various geographical regions.

FIGS. 10, 11, 12A, 12B, 13 and 14 are flowcharts of detailed illustrative processes for audio cancelation, in accordance with some embodiments of this disclosure. In various embodiments, the individual steps of processes 1000, 1100, 1200, 1210, 1300, and 1400 may be implemented by one or more components of the devices and systems of FIGS. 1A, 1B, 6A, 6B, 7-9. Although the present disclosure may describe certain steps of process 1000, 1100, 1200, 1210, 1300, and 1400 (and of other processes described herein) as being implemented by certain components of the devices and systems of FIGS. 1A, 1B, 6A, 6B, 7-9, this is for purposes of illustration only, and it should be understood that other components of the devices and systems of FIGS. 1A, 1B, 6A, 6B, 7-9 may implement those steps instead.

Figure 10:
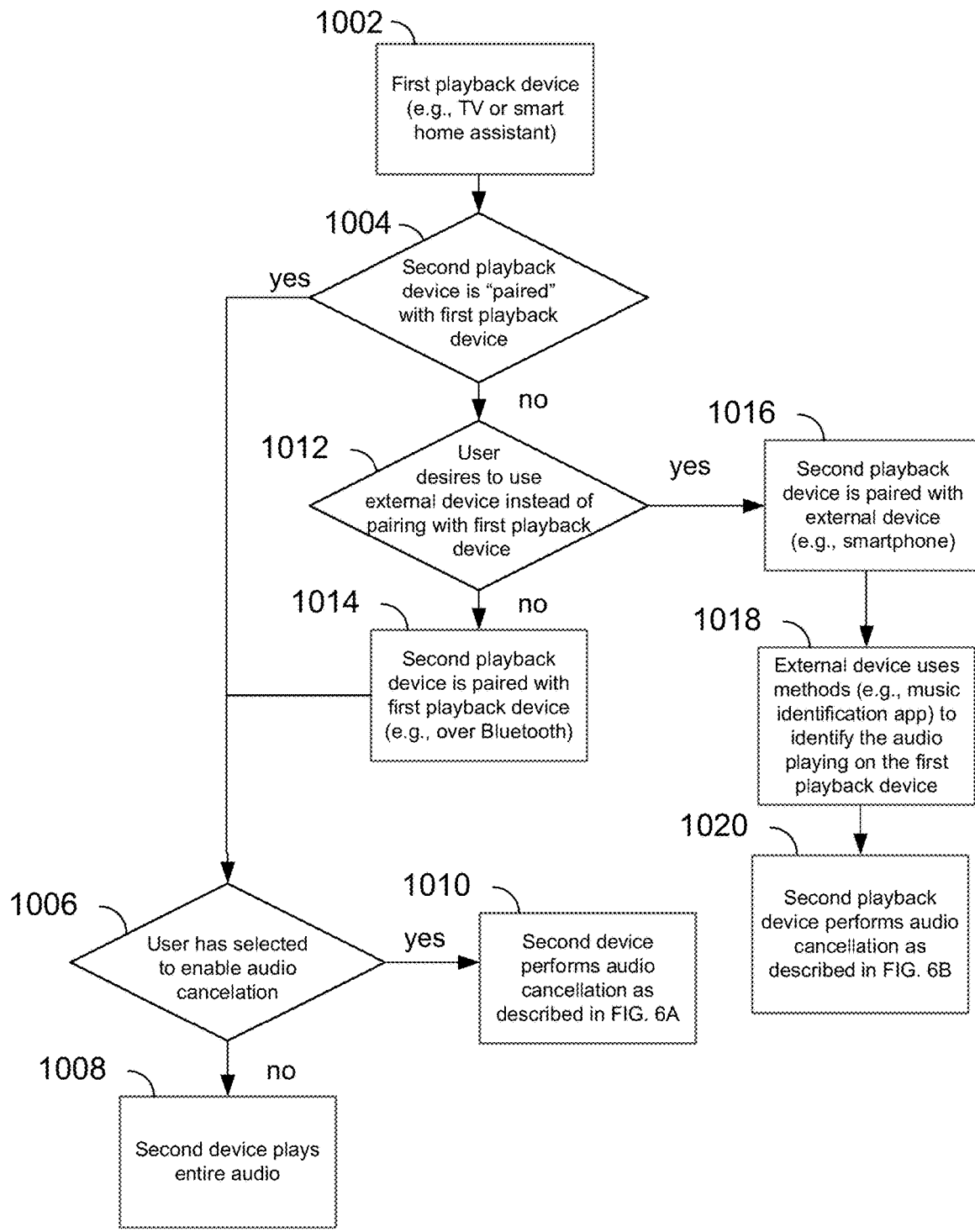

FIG. 10 is a flowchart of a detailed illustrative process 1000 for audio cancelation, in accordance with some embodiments of this disclosure.

At step 1002, the process starts at a first playback device (e.g., TV or smart home assistant, TV or speaker 610, 660 of FIGS. 6A-B). At step 1004, the system determines whether the second playback device (e.g., headphones with microphone(s), headphones with microphone(s) 620, 670 of FIGS. 6A-B) is "paired" with the first playback device. For example, the second playback device being "paired" with the first playback device may indicate that the second playback device is communicatively coupled to the first playback device and may receive content from the first playback device, such as audio cancelation tracks of audio being played by the first playback device via Bluetooth.

At step 1004, if the system determines that the second playback device is paired with the first playback device, then the process proceeds to step 1006. At step 1006, the system determines whether user has selected to enable audio cancelation. If the system determines the user has not selected to enable audio cancelation, the process proceeds to step 1008 where the second device plays the entire audio. If the system determines that the user has selected to enable audio cancelation, then the process proceeds to step 1010. At step 1010, the second device performs audio cancelation as described in FIG. 6A.

At step 1004, if the system (e.g., control circuitry of headphones with microphone(s) 620, 670 of FIGS. 6A-B) determines that the second playback device is not paired with the first playback device, the process proceeds to step 1012. At step 1012, the system determines whether the user desires to use an external device (e.g., external device 680 of FIG. 6B) instead of pairing with the first playback device.

At step 1012, if the user does not desire to use an external device instead of pairing with the first playback device (e.g., user prefers to pair with the first playback device), the process proceeds to step 1014 where the second playback device is paired with the first playback device (e.g., over Bluetooth). After step 1014, the process proceeds to step 1006.

At step 1012, if the system determines that the user desires to use an external device instead of pairing with the first playback device, the process proceeds to step 1016. At step 1016, the second playback device is paired with the external device. At step 1018, the external device uses methods (e.g., music identification app) to identify the audio playing on the first playback device. At step 1020, the second playback device performs audio cancelation as described in FIG. 6B.

Figure 11:
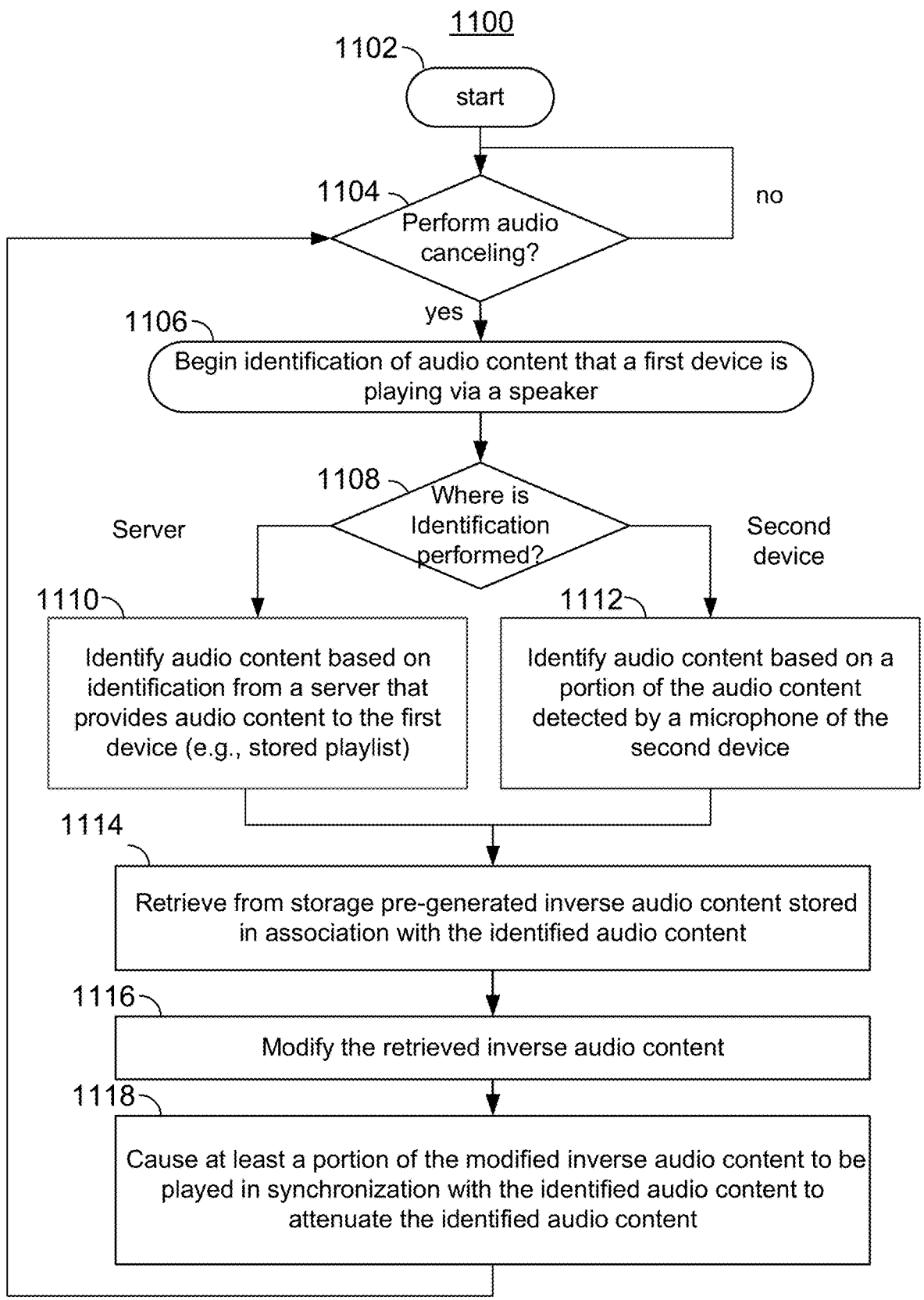

FIG. 11 is a flowchart of a detailed illustrative process 1100 for audio cancelation, in accordance with some embodiments of this disclosure.

At step 1102, the process begins. At step 1104, control circuitry of a user equipment device (e.g., control circuitry 804 of user equipment device 800) may determine whether audio canceling will be performed. If audio canceling will be performed, the process proceeds to step 1106. If audio canceling will not be performed, the process continues to step 1104. Additional detail regarding determining whether audio canceling will be performed (e.g., step 1104) can be found in the descriptions of FIGS. 12A and 12B.

At step 1106, identification of source audio content that a first device is playing via a speaker begins. For example, a first device may be a TV with integrated speakers, a TV with Bluetooth speaker or loudspeaker, or a computing device with a corresponding speaker, etc. Identification of the audio content may be provided by a server (e.g., server 904, transmitted via I/O circuitry 912) that provides source audio content to the first device, or identification of the source audio content may be identified at a second device (e.g., control circuitry 804 of user equipment device 800) based on a portion of the audio content detected by a microphone of the second device (e.g., microphone on audio output equipment 814). In some embodiments, a system may identify source audio content that is to be played (e.g., not currently playing via the speaker). For example, the system may identify source audio content that is to be played via the speaker by a playlist.

At step 1108, if identification is being performed at the server, the process proceeds to step 1110. At step 1110, control circuitry of the first device may identify audio content based on identification by a server that provides source audio content to the first device. For example, the server may have a stored playlist of content that is being played on the first device. In some embodiments, control circuitry of a second device may identify audio content based on identification from the server. For example, the second device may communicate with the server to receive inverse audio content of the content provided to the first device. Additionally or alternatively, the second device may communicate with the first device to receive information identifying the audio content from the first device.

At step 1108, if identification is being performed at a second device, the process proceeds to step 1112. For example, if a user device such identifies the audio content via a music identification application or a user input, the process proceeds to step 1112. At step 1112, control circuitry of the second device (e.g., a smartphone) identifies the source audio content based on a portion of the source audio content detected by a microphone of the second device. For example, the second device may use an audio identification application to identify the source audio content based on a portion of the source audio content detected by the microphone of the second device.

At step 1114, input/output circuitry of the first device or the second device retrieves pre-generated inverse audio content associated with the identified source audio content. The pre-generated inverse audio content may be retrieved from storage and stored in association with the identified source audio content. The inverse audio content may comprise an inverse waveform of a source waveform of the identified source audio content. In some embodiments, the first or second device may receive the inverse audio content from the server. In some embodiments, the first or second device may have the inverse audio content locally stored on the respective device, and the first device may access pre-generated inverse audio content from storage. In some embodiments, the control circuitry of the first device or the second device may identify the pre-generated inverse audio content.

At step 1116, control circuitry of the first or second device modifies at least a portion of the retrieved inverse audio content. For example, the control circuitry may adjust amplitude or phase of the inverse audio signal. Additional detail regarding step 1116 can be found in the description of FIG. 13. In some embodiments, control circuitry of the first or second device modifies the retrieved inverse audio content.

At step 1118, input/output circuitry of the first or second device causes the modified inverse audio content to be played in synchronization with the identified source audio content to attenuate at least a portion of the source audio content. Additional detail regarding step 1118 can be found in the description of FIG. 14. In some embodiments, control circuitry of the first or second device causes at least a portion of the modified inverse audio content to be played in synchronization with the identified audio content to attenuate the identified audio content.

FIG. 12A is a flowchart of a detailed illustrative process 1200 for audio cancelation, in accordance with some embodiments of this disclosure.

At step 1202, input/output circuitry of a first or second device may generate for display a user interface comprising at least one option for audio cancelation. For example, FIG. 7 shows one example of a user interface on a smartphone. In some embodiments, the user interface may be on any suitable user device (e.g., tablet, laptop, etc.).

At step 1204, input/output circuitry of a first or second device may receive a selected option for audio cancelation. For example, a user may select one of the options to cancel audio (e.g., Actor 1, Commentator 1, John's playlist of FIG. 7).

At step 1206, the input/output circuitry of the first or second device may retrieve the pre-generated inverse audio content based on the selected option for audio cancelation. For example, input/output circuitry of the first or second device may retrieve from storage of a content server pre-generated inverse audio content. In some embodiments, the pre-generated inverse audio content may be stored locally on the first or second device, and control circuitry may access the pre-generated inverse audio content.

FIG. 12B is a flowchart of a detailed illustrative process 1210 for, in accordance with some embodiments of this disclosure.

At step 1212, control circuitry of a first or second device accesses a user profile comprising at least one audio cancelation preference. For example, a user profile may include an audio cancelation preference to cancel audio of a particular song, or a particular actor, commentator, or playlist.

At step 1214, control circuitry of the first or second device retrieves the pre-generated inverse audio content based on the at least one option for audio cancelation. For example, control circuitry of the first or second device retrieves the pre-generated inverse audio content for a particular song. In some embodiments, control circuitry may store the pre-generated inverse audio content locally on the first or second device.

Figure 13:
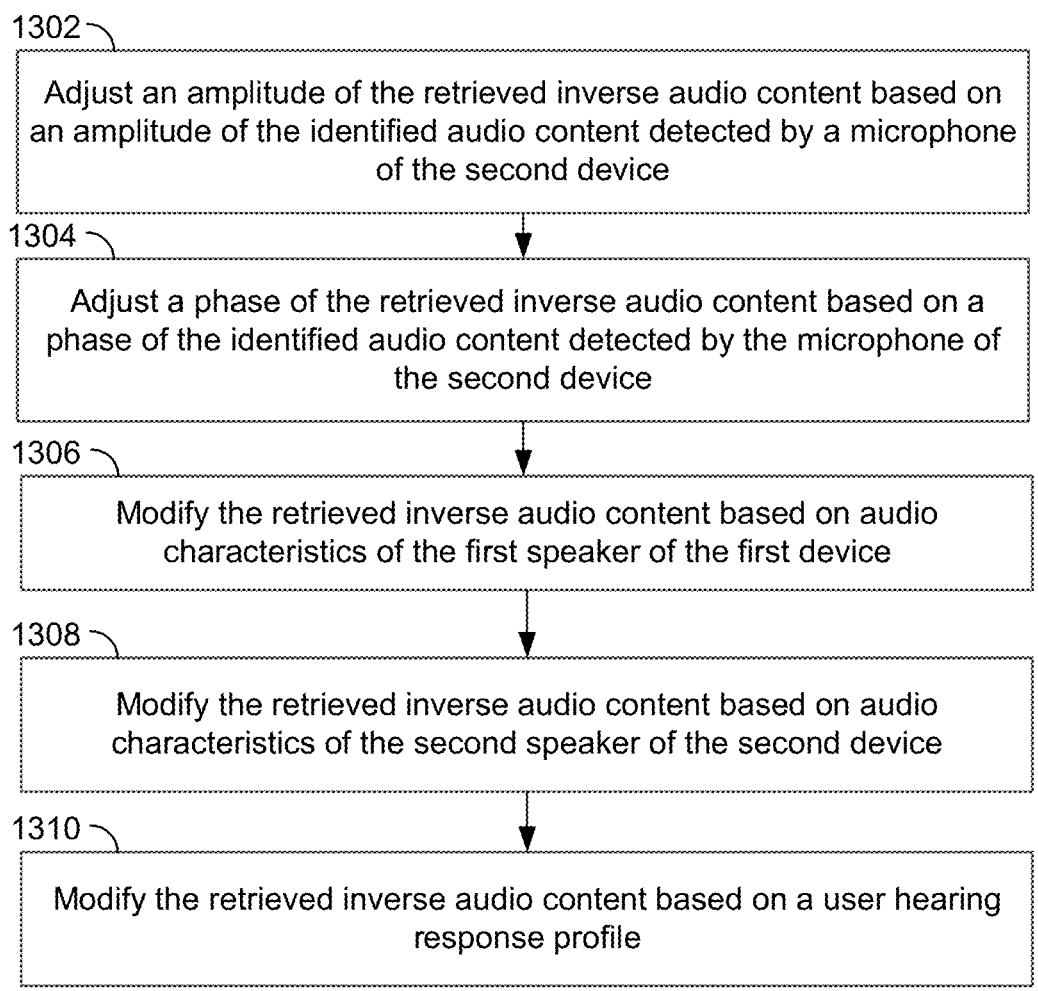

FIG. 13 is a flowchart of a detailed illustrative process 1300 for audio cancelation, in accordance with some embodiments of this disclosure. In some embodiments, any of or all of the steps 1302-1310 may be performed and any of the steps 1302-1310 may be omitted, modified, combined, rearranged, and/or performed simultaneously. In some embodiments, one or more of the steps of process 1300 correspond to step 3 of FIG. 1B, step 3 of FIG. 6A, or step 4 of FIG. 6B.

At step 1302, control circuitry of a second device adjusts an amplitude of the retrieved inverse audio content based on an amplitude of the identified audio content detected by a microphone of the second device. For example, the second device may be headphones 134 of FIG. 1B, or headphones with microphone(s) 620, 670 of FIGS. 6A-B respectively. In some embodiments, the second device may adjust the amplitude of the retrieved inverse audio content to match an amplitude of the identified audio content detected by a microphone of the second device to cancel out the source audio played via the speaker. In some embodiments, the second device may increase the amplitude of the inverse track to help mask the original audio. In some embodiments, the second device may decrease the amplitude of the inverse audio track in cases where the original audio is output at a loudspeaker and the inverse audio is output at a headphone. The adjustment of the amplitude may tie in to aspects of modifying the inverse audio based on characteristics on audio characteristics of the speakers (e.g., steps 1306 and/or 1308). In some embodiments, control circuitry of a first device may adjust an amplitude of the retrieved inverse audio content based on an amplitude of the audio content played via the speaker. For example, the first device may adjust an amplitude of the retrieved inverse audio content to match an amplitude of the audio content played via the speaker to cancel the source audio.

At step 1304, control circuitry of a second device adjusts a phase of the retrieved inverse audio content based on a phase of the identified audio content detected by a microphone of the second device. In some embodiments, the second device may adjust the phase of the retrieved inverse audio content so that the phases of the retrieved inverse audio content and the source audio content as detected by the microphone substantially cancel each other out. In some embodiments, control circuitry of a first device adjusts a phase of the retrieved inverse based on a phase of the audio content played via the speaker. For example, the first device may adjust the phase of the retrieved inverse audio content so that the phases of the retrieved inverse audio content and the source audio content substantially cancel each other out.

At step 1306, control circuitry of a second device modifies the retrieved inverse audio content based on audio characteristics of the first speaker of the first device. For example, the audio characteristics of the first speaker may be known (e.g., audio characteristics of the audio content being played on the first speaker may be predicted/modeled), and the predicted/modeled output from the first speaker may be used in modifying the retrieved inverse audio content. In some embodiments, if the first speaker has an audio characteristic with a notch in a certain frequency band, the second device can modify the retrieved inverse audio content to have a corresponding notch in the frequency band of the inverse audio content to compensate for the audio characteristics of the first speaker when being played at a second speaker.

At step 1308, control circuitry of a second device modifies the retrieved inverse audio content based on audio characteristics of the second speaker of the second device. For example, the audio characteristics of the second speaker may be known (e.g., audio characteristics of the retrieved inverse audio content being played on the second speaker may be predicted/modeled), and the predicted/modeled output from the second speaker may be used in modifying the retrieved inverse audio content. In some embodiments, if a second speaker has an audio characteristic with a notch in a certain frequency band, the second device can modify the retrieved inverse audio content to have a corresponding spike in the frequency band of the inverse audio content to compensate for the audio characteristics of the second speaker when playing the retrieved inverse audio content.

At step 1310, control circuitry of a second device modifies the retrieved inverse audio content based on a user hearing response profile. For example, a user may have a particular hearing response profile in which the user may not hear or be sensitive for frequencies in a first range, however the user may be sensitive to frequencies in a second range. The control circuitry of the second device may therefore remove portions of the retrieved inverse audio content in the first frequency range, or reduce the amount of bits used for adjusting inverse audio content in the first frequency range as the user may not hear audio content or be particularly sensitive to frequencies in that range. The control circuitry of the second device may allocate more bits or resolution of the inverse audio content in a second range that the user may have more sensitivity to.

In some embodiments, the source/original audio output may be modified to assist with audio cancelation. For example, the second device may adjust the volume of the original audio output from the first speaker, if increasing the volume or amplitude of the inverse audio output from the second speaker is not possible or desirable. Illustratively, if the original audio output (or a portion thereof) is quite loud in volume from one or more loudspeakers, it may not be desirable to play an equally or even louder inverse audio output at the headphones.

Figure 14:
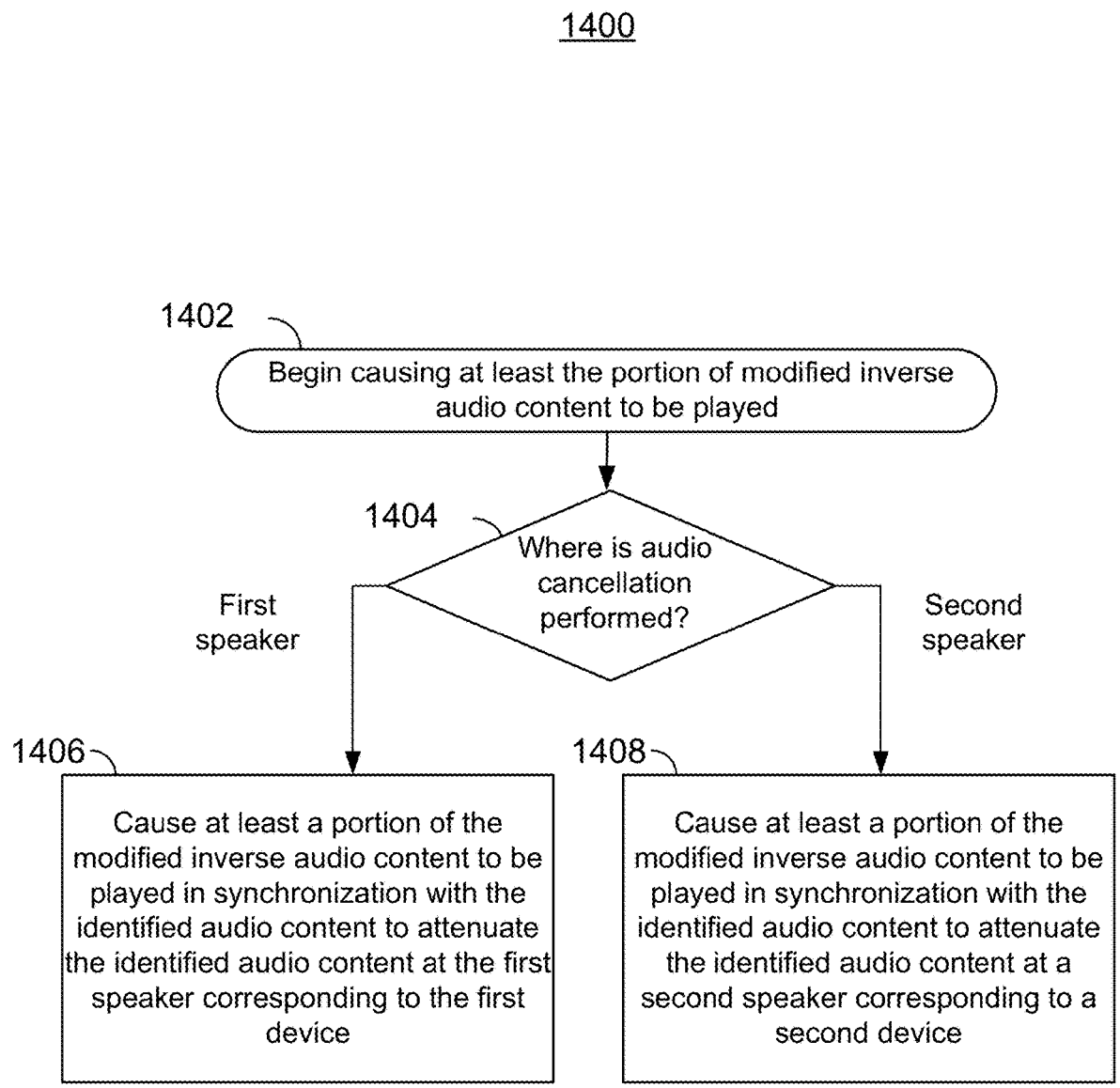

FIG. 14 is a flowchart of a detailed illustrative process 1400 for audio cancelation, in accordance with some embodiments of this disclosure.

At step 1402, control circuitry begins causing at least a portion of modified inverse audio content to be played.

At step 1404, if audio cancelation is performed at the first speaker, the process proceeds to step 1406 where input/output circuitry causes at least a portion of the modified inverse audio content to be played in synchronization with the identified audio content to attenuate the identified audio content at the first speaker corresponding to the first device. As an example, a user may decide that they do not want to hear audio content from a particular actor. The audio cancelation of the particular actor may be done at the first speaker which is transmitting the audio content (e.g., speaker 104 of device 102 of FIG. 1A). The speaker 104 may be a loudspeaker, or headphones of a user. By combining the inverse audio content of the actor's spoken audio with the ambient sound from the playback device including the single actor's spoken audio, the single actor's spoken audio may be canceled.

At step 1404, if audio cancelation is performed at the second speaker, control circuitry causes at least a portion of the modified inverse audio content to be played in synchronization with the identified audio content to attenuate the identified audio content at the second speaker corresponding to the second device. For example, the audio cancelation of the audio content from the first speaker (e.g., speaker 130 of FIG. 1B, speaker 610 of FIG. 6A, speaker 660 of FIG. 6B) is canceled using the inverse audio content played by a second speaker (e.g., speaker 134 of FIG. 1B, speaker of headphones 620 of FIG. 6A, speaker of headphones 670 of FIG. 6B).

The processes discussed above are intended to be illustrative and not limiting. One skilled in the art would appreciate that the steps of the processes discussed herein may be omitted, modified, combined and/or rearranged, and any additional steps may be performed without departing from the scope of the disclosure. More generally, the above disclosure is meant to be illustrative and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   identifying source audio content that a first device is playing via a first speaker;
   retrieving pre-generated inverse audio content associated with the identified source audio content;
   modifying at least a portion of the retrieved inverse audio content; and
   causing the modified inverse audio content to be played in synchronization with the identified source audio content to attenuate at least a portion of the source audio content that is playing via the first speaker.

2. The method of claim 1, further comprising:
   generating for display a user interface comprising at least one option for audio cancelation; and
   receiving a selected option for audio cancelation, wherein the retrieving the pre-generated inverse audio content is based on the selected option for audio cancelation.

3. The method of claim 1, wherein the retrieving the pre-generated inverse audio content is based on a user profile comprising at least one audio cancelation preference.

4. The method of claim 1, wherein the identifying the source audio content is performed at the first device, and wherein the causing the modified inverse audio content to be played is at the first speaker corresponding to the first device.

5. The method of claim 1, wherein the causing the modified inverse audio content to be played is performed via a second speaker corresponding to a second device.

6. The method of claim 5, wherein the identifying the source audio content is based on an identification of the source audio content by a server that provides the source audio content to the first device.

7. The method of claim 5, wherein the identifying the source audio content is based on a portion of the source audio content detected by a microphone of the second device.

8. The method of claim 5, wherein the modifying the at least the portion of the retrieved inverse audio content comprises:
   adjusting an amplitude of the retrieved inverse audio content based on an amplitude of the identified source audio content detected by a microphone of the second device.

9. The method of claim 5, wherein the modifying the at least the portion of the retrieved inverse audio content comprises:
   adjusting a phase of the retrieved inverse audio content based on a phase of the identified source audio content detected by a microphone of the second device.

10. The method of claim 5, wherein the modifying the at least the portion of the retrieved inverse audio content is based on audio characteristics of the first speaker of the first device.

11. The method of claim 5, wherein the modifying the at least the portion of the retrieved inverse audio content is based on audio characteristics of the second speaker of the second device.

12. The method of claim 5, wherein the modifying the at least the portion of the retrieved inverse audio content is based on a user hearing response profile.

13. The method of claim 1, further comprising:
   analyzing an audio output of the identified source audio content from the first speaker, wherein the modifying the at least the portion of the retrieved inverse audio content is based at least in part on the analysis of the audio output.

14. The method of claim 1, further comprising:
identifying the pre-generated inverse audio content associated with the identified source audio content, wherein the pre-generated inverse audio content comprises an inverse waveform of a source waveform of the identified source audio content.

15. The method of claim 1, wherein the pre-generated inverse audio content associated with the identified source audio content comprises a voice of a single actor, and the identified source audio content comprises multiple voices.

16. A system comprising:
control circuitry configured to:
identify source audio content that a first device is playing via a first speaker;
retrieve pre-generated inverse audio content associated with the identified source audio content; and
modify at least a portion of the retrieved inverse audio content; and
input/output circuitry configured to:
cause the modified inverse audio content to be played in synchronization with the identified source audio content to attenuate at least a portion of the source audio content that is playing via the first speaker.

17. The system of claim 16, wherein the input/output circuitry is configured to cause the modified inverse audio content to be played via a second speaker corresponding to a second device.

18. The system of claim 17, wherein the control circuitry is configured to modify the at least the portion of the retrieved inverse audio content by:
adjusting an amplitude of the retrieved inverse audio content based on an amplitude of the identified source audio content detected by a microphone of the second device.

19. The system of claim 17, wherein the control circuitry is configured to modify the at least the portion of the retrieved inverse audio content by:
adjusting a phase of the retrieved inverse audio content based on a phase of the identified source audio content detected by a microphone of the second device.

20. The system of claim 17, wherein the control circuitry is configured to modify the at least the portion of the retrieved inverse audio content based on audio characteristics of the first speaker of the first device.

* * * * *